(12) United States Patent
Ito et al.

(10) Patent No.: US 9,373,927 B2
(45) Date of Patent: Jun. 21, 2016

(54) METHOD FOR DESIGNING LASER-LIGHT-SHAPING OPTICAL COMPONENT, METHOD FOR PRODUCING LASER-LIGHT-SHAPING OPTICAL COMPONENT, AND LASER-LIGHT-SHAPING OPTICAL SYSTEM

(71) Applicant: HAMAMATSU PHOTONICS K.K., Hamamatsu-shi, Shizuoka (JP)

(72) Inventors: Haruyasu Ito, Hamamatsu (JP); Takashi Yasuda, Hamamatsu (JP)

(73) Assignee: HAMAMATSU PHOTONICS K.K., Hamamatsu-shi, Shizuoka (JP)

( * ) Notice: Subject to any disclaimer, the term of this patent is extended or adjusted under 35 U.S.C. 154(b) by 92 days.

(21) Appl. No.: 14/371,476

(22) PCT Filed: Oct. 12, 2012

(86) PCT No.: PCT/JP2012/076501
§ 371 (c)(1),
(2) Date: Jul. 10, 2014

(87) PCT Pub. No.: WO2013/108450
PCT Pub. Date: Jul. 25, 2013

(65) Prior Publication Data
US 2014/0348190 A1 Nov. 27, 2014

(30) Foreign Application Priority Data
Jan. 16, 2012 (JP) ................................ 2012-006489

(51) Int. Cl.
| | | |
|---|---|---|
| *H01S 3/10* | (2006.01) | |
| *B29D 11/00* | (2006.01) | |
| *G01B 11/24* | (2006.01) | |
| *G01J 1/42* | (2006.01) | |
| *G02B 27/09* | (2006.01) | |
| *B23K 26/06* | (2014.01) | |
| *G02B 13/18* | (2006.01) | |
| *H01S 3/00* | (2006.01) | |

(52) U.S. Cl.
CPC .............. *H01S 3/10* (2013.01); *B23K 26/0608* (2013.01); *B23K 26/0648* (2013.01); *B29D 11/00019* (2013.01); *G01B 11/24* (2013.01); *G01J 1/4257* (2013.01); *G02B 27/0927* (2013.01); *G02B 27/0955* (2013.01); *G02B 13/18* (2013.01); *H01S 3/005* (2013.01); *H01S 2301/206* (2013.01)

(58) Field of Classification Search
CPC ....... H01S 3/10; H01S 3/005; G02B 27/0012; G02B 27/00
USPC ......... 359/708, 642, 896; 372/29.01; 264/1.1; 356/124; 703/1, 2
See application file for complete search history.

(56) References Cited

U.S. PATENT DOCUMENTS
3,476,463 A 11/1969 Kreuzer

FOREIGN PATENT DOCUMENTS
| | | |
|---|---|---|
| CN | 1247992 | 3/2000 |
| CN | 101943845 | 1/2011 |

(Continued)

OTHER PUBLICATIONS
Hiroshi Ito et al., "Design of Beam Homogenizer for Material Processing and Its Applications," The Laser Society of Japan, general incorporated association, Nov. 1994, pp. 935-942, including partial English translation.

*Primary Examiner* — Darryl J Collins
*Assistant Examiner* — Kristina Deherrera
(74) *Attorney, Agent, or Firm* — Drinker Biddle & Reath LLP

(57) ABSTRACT

A method for designing an optical component for shaping laser light according to one embodiment of this invention measures the intensity distribution of an incident laser light, obtains the shapes in the short and long axial directions of a pair of aspheric lenses for each of the short and long axial directions of the incident laser light from the measured intensity distribution of the incident laser light and a desired intensity distribution, performs approximation of a high-order polynomial of the shapes in the short and long axial directions of the pair of aspheric lenses, corrects the high-order polynomials for the short or long axial directions using a correction factor, and obtains the shapes of the pair of aspheric lenses on the basis of the corrected high-order polynomials.

11 Claims, 37 Drawing Sheets

(56) References Cited

FOREIGN PATENT DOCUMENTS

| | | |
|---|---|---|
| CN | 102135665 | 7/2011 |
| JP | H10-153750 A | 6/1998 |
| JP | 2003-344762 A | 12/2003 |
| JP | 2007-102091 A | 4/2007 |
| JP | 2012-022252 A | 2/2012 |
| JP | 2012-037572 A | 2/2012 |
| JP | 2012-168328 A | 9/2012 |

METHOD FOR DESIGNING LASER-LIGHT-SHAPING OPTICAL COMPONENT, METHOD FOR PRODUCING LASER-LIGHT-SHAPING OPTICAL COMPONENT, AND LASER-LIGHT-SHAPING OPTICAL SYSTEM

TECHNICAL FIELD

The present invention relates to a method of designing and manufacturing an optical component for shaping laser light which shapes intensity distribution of the laser light into predetermined intensity distribution, wherein the optical component for shaping laser light is an aspheric lens type with at least one pair of aspheric lenses.

BACKGROUND ART

Generally, laser light mainly has intensity distribution which is most strong near a center of a light axis and gradually weaker toward a periphery of the light axis, described as Gaussian distribution. However, with laser machining (laser processing), laser light with even intensity distribution in space has been required. With respect to the laser light with even intensity distribution, non-patent literature 1 discloses a kaleidoscope type homogenizer as an optical component for shaping laser light which shapes intensity distribution of laser light into spatially even intensity distribution, and patent literature 1, 2 and 3 disclose an aspheric lens type homogenizer as an optical component for shaping laser light which shapes intensity distribution of laser light into spatially even intensity distribution.

The aspheric lens type homogenizer disclosed in the patent literature 1 includes a pair of aspheric lenses which have a shape deduced by a geometrical optics method, and converts intensity distribution of incident laser light with an intensity profile of Gaussian distribution into top-hat shaped intensity distribution. On the one hand, the aspheric lens type homogenizer disclosed in the patent literature 2 includes a pair of aspheric lenses which have a shape deduced by an undulate optics (a wave optics) method, and converts intensity distribution of incident laser light with an intensity profile of Gaussian distribution into top-hat shaped intensity distribution. On the other hand, the aspheric lens type homogenizer disclosed in the patent literature 3 includes a pair of aspheric lenses, and converts intensity distribution of incident laser light with an intensity profile of Gaussian distribution into intensity distribution corresponding to super Gaussian distribution.

CITATION LIST

Patent Literature

Patent Literature 1: U.S. Pat. No. 3,476,463
Patent Literature 2: Japanese Patent Laid-Open Publication No. 10-153750
Patent Literature 3: Japanese Patent Laid-Open Publication No. 2003-344762

Non-Patent Literature

Non-Patent Literature 1: "Design of Beam Homogenizer for Material Processing and Its Applications", The Review of Laser Engineering, published by Hiroshi ITO and Takashi OBARA, The Laser Society of Japan, general incorporated association, on November, 1994, Volume 22, Number 11, pages 935-942.

SUMMARY OF INVENTION

Technical Problem

In the patent literatures 1, 2 and 3, in designing of shapes of a pair of aspheric lenses, Gaussian distribution calculated by using a Gaussian function, i.e., theoretical value is used for intensity distribution of incident laser light. However, in actual fact, the intensity distribution of the laser light incident to the homogenizer has deviated from the theoretical value. For this reason, in the method of designing the homogenizer disclosed in the Patent Literatures 1, 2 and 3, a laser light shaping precision is low, and a distortion occurs in desired intensity distribution of the laser light after shaping.

Accordingly, the present invention has been made to solve the above-mentioned problems in the prior art, and an aspect of the present invention is to provide a method of designing and manufacturing an optical component for shaping laser light, which includes a pair of aspheric lenses and is capable of shaping intensity distribution of the laser light into a predetermined intensity distribution at a high precision.

Solution to Problem

In accordance with an aspect of the present invention, a method of designing an optical component for shaping laser light, which includes a pair of aspheric lenses and shapes an intensity distribution of incident laser light with different divergence angles (spread angles, diffusion angles) into a desired intensity distribution so as to generate emitted laser light, is provided. The method includes: measuring the intensity distribution of the incident laser light; dividing the measured intensity distribution of the incident laser light in a distribution direction so as to obtain a plurality of incident light division areas, for each of a short-axial direction and a long-axial direction of the incident laser light, in an incident aspheric lens of the pair of the aspheric lenses; dividing an intensity distribution of the emitted laser light in a distribution direction, so as to obtain a plurality of emitted light division areas by adjusting a height of each of the plurality of incident light division areas and simultaneously adjusting a width and a position of the distribution direction of each of the plurality of incident light division areas according to the desired intensity distribution, for each of the short-axial direction and the long-axial direction, in an emitting aspheric lens of the pair of the aspheric lenses; specifying a light path from a position of the distribution direction of the plurality of incident light division areas in the incident aspheric lens and a corresponding position of the distribution direction of the plurality of emitted light division areas in the emitting aspheric lens for each of the short-axial direction and the long-axial direction; obtaining shapes in the short-axial direction and the long-axial direction of the pair of the aspheric lenses from the light path; performing approximation of a high-order (high-degree, high-dimensional) polynomial of the shapes in the short-axial direction and long-axial direction of the pair of the aspheric lenses, so as to obtain high-order polynomials of the short-axial direction and the long-axial direction; correcting the high-order polynomial of the short—axial direction or the high-order polynomial of the long-axial direction by using a correction coefficient based on a rotary angle of a radius vector of the incident laser light, a ratio defined by (determined by, obtained from) a radius vector of the long-axial direction and a radius vector of the short-axial direction of the incident laser light, and a ratio defined by the shape in the long-axial direction and the shape in the short-axial direction for each of the pair of the aspheric lens, so as to obtain the corrected high-order polynomial; and obtaining shapes of the pair of the aspheric lenses based on the corrected high-order polynomial.

In accordance with another aspect of the present invention, there is provided a method of manufacturing an optical component for shaping laser light, which includes a pair of aspheric lenses and shapes an intensity distribution of incident laser light with different divergence angles into a desired intensity distribution so as to generate emitted laser light, the method includes: measuring the intensity distribution of the incident laser light; dividing the measured intensity distribution of the incident laser light in a distribution direction so as to obtain a plurality of incident light division areas for each of a short-axial direction and a long-axial direction of the incident laser light, in an incident aspheric lens of the pair of the aspheric lenses; dividing an intensity distribution of the emitted laser light in a distribution direction, so as to obtain a plurality of emitted light division areas by adjusting a height of each of the plurality of incident light division areas and simultaneously adjusting a width and a position of the distribution direction of each of the plurality of incident light division areas according to the desired intensity distribution, for each of the short-axial direction and the long-axial direction, in an emitting aspheric lens of the pair of the aspheric lenses; specifying a light path from a position of the distribution direction of the plurality of incident light division areas in the incident aspheric lens and a corresponding position of the distribution direction of the plurality of emitted light division areas in the emitting aspheric lens for each of the short-axial direction and the long-axial direction; obtaining shapes in the short-axial direction and the long-axial direction of the pair of the aspheric lenses from the light path; performing approximation of a high-order polynomial of the shapes in the short-axial direction and long-axial direction of the pair of the aspheric lenses, so as to obtain high-order polynomials of the short-axial direction and the long-axial direction; correcting the high-order polynomial of the short-axial direction or the high-order polynomial of the long-axial direction by using a correction coefficient based on a rotary angle of a radius vector of the incident laser light, a ratio defined by a radius vector of the long-axial direction and a radius vector of the short-axial direction of the incident laser light, and a ratio defined by the shape in the long-axial direction and the shape in the short-axial direction for each of the pair of the aspheric lens, so as to obtain the corrected high-order polynomial; obtaining shapes of the pair of the aspheric lenses based on the corrected high-order polynomial and; forming the pair of aspheric lenses based on the obtained shapes.

According to the method of designing and manufacturing the optical component for shaping laser light, the intensity distribution of the incident laser light is really measured, and the shapes of the pair of aspheric lenses is designed based on the measured intensity distribution. Further, a plurality of incident light division areas in which the measured intensity distribution of the incident laser light is divided are obtained, and a plurality of emitted light division areas in which a height of each of the plurality of incident light division areas is adjusted while a width and a position thereof is adjusted according to a desired intensity distribution of the emitted laser light are obtained. Then, light paths are specified from a position of the plurality of the incident light division areas in an incident aspheric lens and a corresponding position of the plurality of the emitted light division areas in an emitting aspheric lens. Thus, the shapes of the pair of aspheric lenses are designed based on these light paths. Accordingly, it is possible to obtain the optical component for shaping the laser light, which is capable of shaping the intensity distribution of the laser light into the predetermined intensity distribution at a higher precision.

In the case that the incident laser light has a concentric circle shape and divergence angles are identical in all radial directions, however, an aspheric shape is obtained for a first direction of the radial directions by a reference point of a peak. However, if a semiconductor laser and the like, which generates laser light in which a divergence angle of a horizontal direction and a divergence angle of a vertical direction are different from each other (astigmatism), is used, the incident laser light may not have the concentric circle shape and may have a different divergence angle depending on a rotary angle (radial direction) of a radius vector.

According to the method of designing and manufacturing the optical component for shaping the laser light, therefore, a two dimensional shape of a short-axial direction and a long-axial direction of each of a pair of aspheric lenses is obtained for each of the short axial direction and the long-axial direction of the incident laser light, high-order polynomial approximation to the shape of the short-axial direction and the long-axial direction of each of the pair of aspheric lenses is performed, a high-order polynomial of the short-axial direction or a high-order polynomial of the long-axial direction is corrected by using a correction coefficient based on a rotary angle of a radius vector of the incident laser light, a ratio defined by a radius vector of the long-axial direction and a radius vector of the short-axial direction of the incident laser light, and a ratio defined by the shape in the long-axial direction and the shape in the short-axial direction for each of the pair of the aspheric lens, and a three dimensional shape of each of the pair of the aspheric lenses is designed based on the corrected high-order polynomial. Accordingly, it is possible to obtain the optical component for shaping the laser light, which is capable of shaping the intensity distribution of the laser light into the predetermined intensity distribution at a higher precision.

In the dividing of the intensity distribution of the emitted laser light, the width and the position of the distribution direction of the plurality of incident light division areas may be adjusted to obtain the plurality of emitted light division areas so that energy of the plurality of incident light division areas is equal to corresponding energy of the plurality of emitted light division areas.

In the measuring of the intensity distribution of the incident laser light, further, the divergence angles of the incident laser light may be measured, and in the obtaining of the shapes in the short-axial direction and the long-axial direction, a shape of the emitting aspheric lens may be obtained from the light path and the measured divergence angles of the incident laser light.

Further, in the obtaining of the shapes in the short-axial direction and the long-axial direction, the shape of the emitting aspheric lens may be obtained from the light path and the desired divergence angle of the emitted laser light.

Thus, in the case that it is desired to obtain the emitted laser light which is non-parallel light and has a predetermined divergence angle, it is possible to obtain the emitting aspheric lens which is capable of being in phase of the laser light shaped by the incident aspheric lens and changing the laser light into non-parallel light with a desired divergence angle at a high precision.

Further, in the obtaining of the shapes in the short-axial direction and the long-axial direction, with each of the plurality of incident light division areas, an incident angle of refracted incident laser light, which is the incident laser light refracted in a plane surface of the incident aspheric lens, for an emitting aspheric surface of the incident aspheric lens, may be obtained from an angle defined by the light path to a main axis perpendicular to an incident plane surface of the incident aspheric lens and the measured divergence angle of the incident laser light, and a difference of elevation of the aspheric surface of the incident aspheric lens may be obtained from the incident angle of the refracted incident laser light for the aspheric surface of the incident aspheric lens.

Further, in the obtaining of the shapes in the short-axial direction and the long-axial direction, with each of the plurality of emitted light division areas, a refraction angle of the light path for an incident aspheric surface of the emitting aspheric lens may be obtained from an angle defined by the light path for the main axis perpendicular to an emitting plane surface of the emitting aspheric lens and the desired divergence angle of the emitted laser light, and a difference of elevation of the aspheric surface of the emitting aspheric lens may be obtained from the refraction angle of the light path for the aspheric surface of the emitting aspheric lens.

Furthermore, in the obtaining of the shapes in the short-axial direction and the long-axial direction, the shape of the emitting aspheric lens may be obtained from the light path so that the emitted laser light is in phase and forms parallel light.

Thus, in the case that it is desired to obtain the emitted laser light which is non-parallel light and has a predetermined divergence angle, it is possible to obtain the emitting aspheric lens which is capable of being in phase of the laser light shaped by the incident aspheric lens and changing the laser light into non-parallel light with a desired divergence angle at a high precision.

In addition, in the obtaining of the shapes in the short-axial direction and the long-axial direction, with each of the plurality of emitted light division areas, an emission angle of the emitted laser light for the incident aspheric surface of the emitting aspheric lens may be obtained from an angle defined by the light path for the main axis perpendicular to an emitting plane surface of the emitting aspheric lens, and a difference of elevation of an aspheric surface of the emitting aspheric lens may be obtained from the emission angle of the emitted laser light for the aspheric surface of the emitting aspheric lens.

In accordance with still another aspect of the present invention, an optical system for shaping laser light is provided. The optical system includes: a light source for generating laser light with different divergence angles; an optical component for shaping laser light so as to shape intensity distribution of the laser light from the light source into a desired intensity distribution, which is designed by the method of designing the optical component for shaping the laser light; and a condensing lens for condensing the laser light from the optical component for shaping the laser light.

On the other hand, in accordance with still another aspect of the present invention, an optical system for shaping laser light is provided. The optical system includes: a plurality of light sources for generating the laser light with different divergence angles, which are arranged in two dimensions; a plurality of optical components for shaping laser light, which are arranged in two dimensions, shape an intensity distribution of the laser light from each of the plurality of light sources in a desired intensity distribution and are designed by the method of designing the optical component for shaping the laser light; and a condensing lens for condensing the laser light from the plurality of optical components for shaping the laser light.

Advantageous Effects of Invention

According to the present invention, it is possible to acquire an optical component for shaping laser light which is provided with a pair of aspheric lenses, and is capable of shaping intensity distribution of laser light into a predetermined intensity distribution in a higher precision. According to the present invention, further, it is possible to obtain an optical component for shaping laser light which is capable of shaping intensity distribution of laser light into a predetermined intensity distribution at a higher precision even for incident laser light having different divergence angles.

DESCRIPTION OF EMBODIMENTS

Hereinafter, an appropriate embodiment of a method of designing and manufacturing an optical component for shaping laser light and an optical system for shaping laser light of the present invention will be described in detail with reference to the drawings. Further, identical numerals are used to denote the same or similar components in each drawing.

Comparative Example

Figure 1:
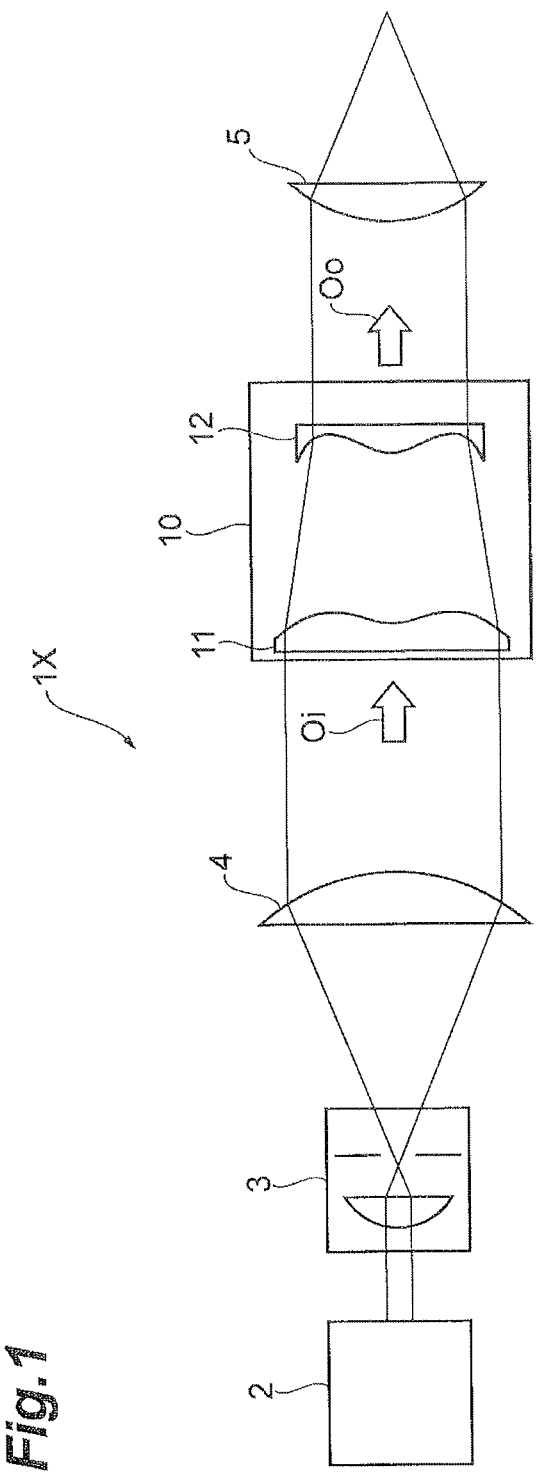
FIG. 1 is a view illustrating a structure of a comparison example of an optical system for shaping laser light, in which the optical system is provided with a homogenizer.

Firstly, a comparative example of an optical system for shaping laser light which is used for a laser processing apparatus and the like, and includes a homogenizer (an optical component for shaping the laser light) will be described. FIG. 1 is a view illustrating a structure of an optical system for shaping the laser light of the comparison example. The optical system for shaping the laser light 1× includes a laser light source 2, a spatial filter 3, a collimate lens 4, a homogenizer 10 and a condensing lens 5.

The laser light source 2 is, for example, Neodymium-Doped Yttrium Aluminum Garnet (Nd:YAG) laser. The spatial filter 3 includes, for example, an objective lens of 10× magnification, and a pinhole with a diameter Φ of 50 μm. The collimate lens 4 is, for example, a plane-convex lens. In the structure described above, the laser light emitted from the laser light source passes through the spatial filter 3 and the collimate lens 4, so that intensity distribution is shaped in Gaussian distribution of a concentric circle.

The homogenizer 10 is used to shape the intensity distribution of the laser light into a predetermined shape. The homogenizer 10 includes a pair of aspheric lenses 11 and 12. In the homogenizer 10, the incident aspheric lens 11 functions as an intensity conversion lens for shaping the intensity distribution of the laser light into the predetermined shape, and the emitting aspheric lens 12 functions as a phase correction lens so that the shaped laser light is in phase and change the laser light into parallel light or light with a predetermined divergence angle. In the homogenizer 10, the pair of the aspheric lenses 11 and 12 are designed in an aspheric shape, thereby shaping the intensity distribution of the incident laser light Oi into a desired intention distribution so as to generate emitted laser light Oo. The emitted laser light Oo emitted from the homogenizer 10 is condensed by the condensing lens 5.

First Comparative Example

Figure 2:
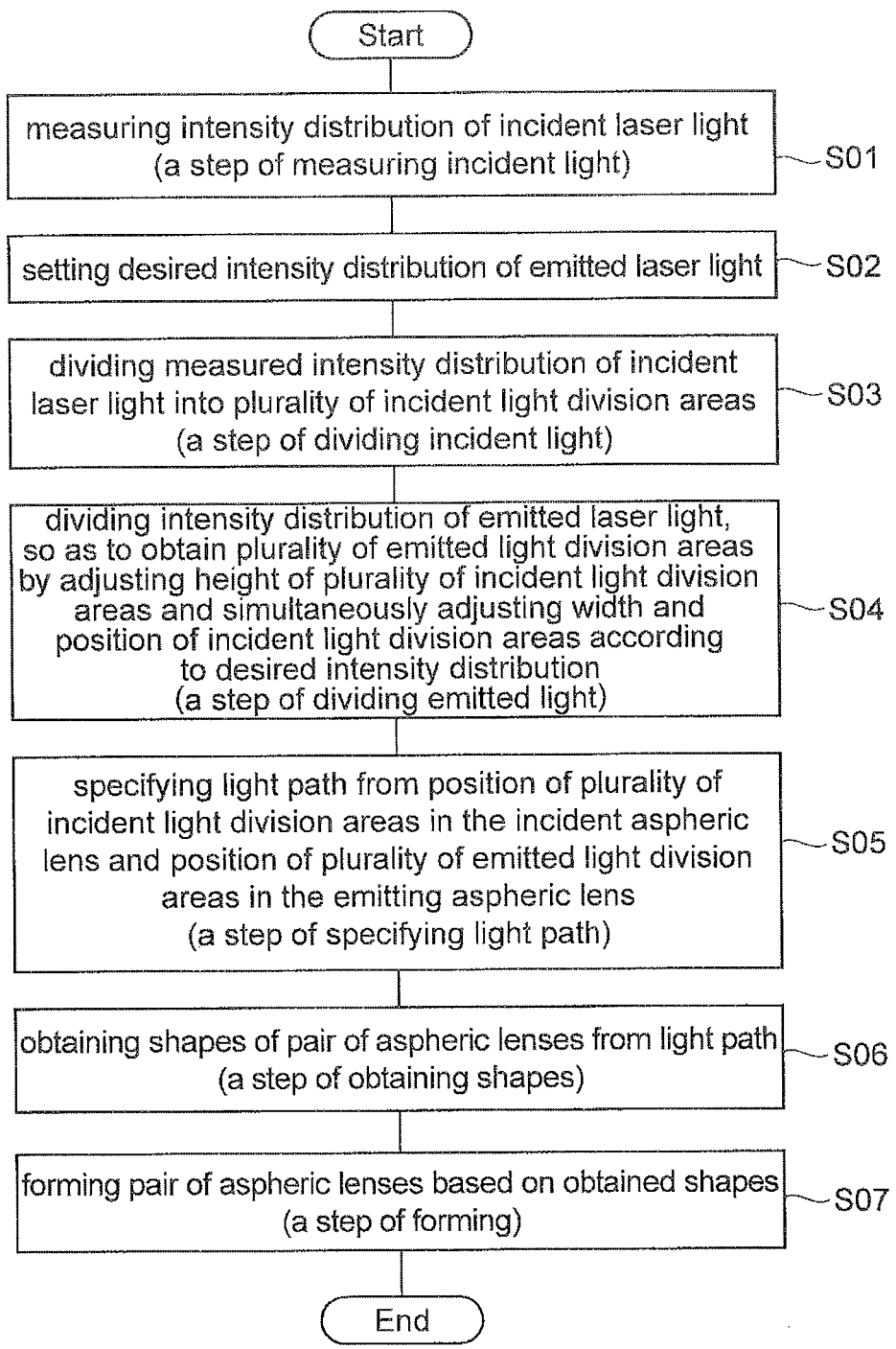
FIG. 2 is a flowchart illustrating a process of designing and manufacturing the homogenizer according to a first comparative example.

Hereinafter, a method of designing and manufacturing the homogenizer according to the first comparative example, for changing incident laser light Oi which is parallel light into emitted laser light Oo which is parallel light, will be described with reference to FIG. 2. FIG. 2 is a flowchart illustrating a process of designing and manufacturing the homogenizer according to the first comparison example.

First, the intensity distribution of the incident laser light Oi is measured (a step of measuring incident light) in step S01. It is possible to perform the measurement of the intensity distribution, for example, by using a beam profiler.

Then, the desired intensity distribution of the emitted laser light Oo is set in step S02. In this comparative example, the desired intensity distribution is set as a spatially even intention distribution, i.e., super Gaussian distribution, required in the laser processing apparatus. Here, it is necessary to set the desired intention distribution so that energy (area of intensity distribution) of the emitted laser light Oo is equal to energy (area of intensity distribution) of the incident laser light Oi. For example, a setting of the super Gaussian distribution of the comparison example is performed as follows.

Figure 3:
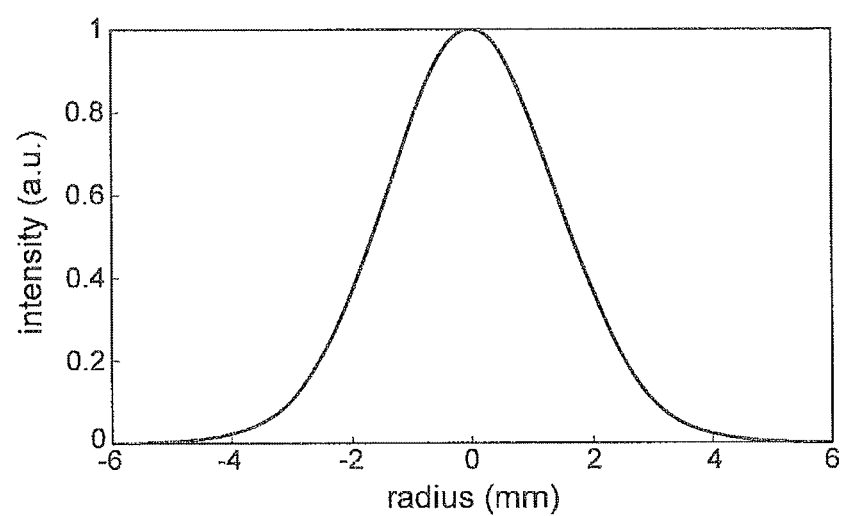
FIG. 3 is a view illustrating an example of intensity distribution of incident laser light.

Hereinafter, in order to help in understanding a principle of the setting of the desired intensity distribution of the emitted laser light Go, it is assumed that the intensity distribution of the incident laser light Oi is the Gaussian distribution (beam waist=5.6 mmat, $1/e^2$, ω=2.0 mm) in concentric circles, as shown in FIG. 3. The Gaussian distribution is indicated by Equation (1), and energy within a range of a radius of 6 mm of the incident laser light Oi is calculated by Equation (2).

$$I_1(r) = \exp\left\{-\left(\frac{r}{\omega}\right)^2\right\} \tag{1}$$

$$\int_{-6}^{6} I_1(r)\,dr = 1.76689 \tag{2}$$

In this case, since the Gaussian distribution is rotation symmetry around a radius of 0 mm, an aspheric shape is designed by one dimensional analysis. On the other hand, in actuality, a measured value of step S01 is used as the energy of the incident laser light Oi.

Figure 4:
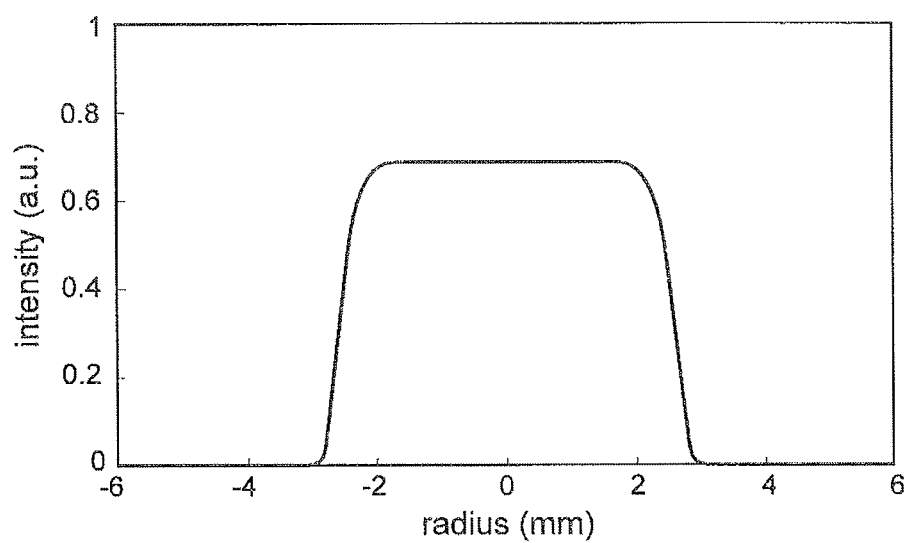
FIG. 4 is a view illustrating an example of a desired intensity distribution of emitted laser light.

On the other hand, the desired intensity distribution of the emitted laser light Oo is set as the super Gaussian distribution (dimension N=8, ω=2.65 mm), as shown in FIG. 4. Since the super Gaussian distribution is indicated by Equation (3), a value of area of uniform strength of the emitted laser light Oo is set to $E_0$=0.687 so that the energy within a range of a radius of 6 mm of the emitted laser light Oo is equal to the energy of the incident laser light Oi like as Equation (4).

$$I_2(r) = E_0 \times \exp\left\{-\left(\frac{r}{\omega}\right)^{2N}\right\} \tag{3}$$

$$\int_{-6}^{6} I_1(r)\,dr = \int_{-6}^{6} I_2(r)\,dr \tag{4}$$

On the other hand, based on the method, it is possible to set the desired intensity distribution of the emitted laser light to not only a prescribed function but also a predetermined intensity distribution.

Figure 5:
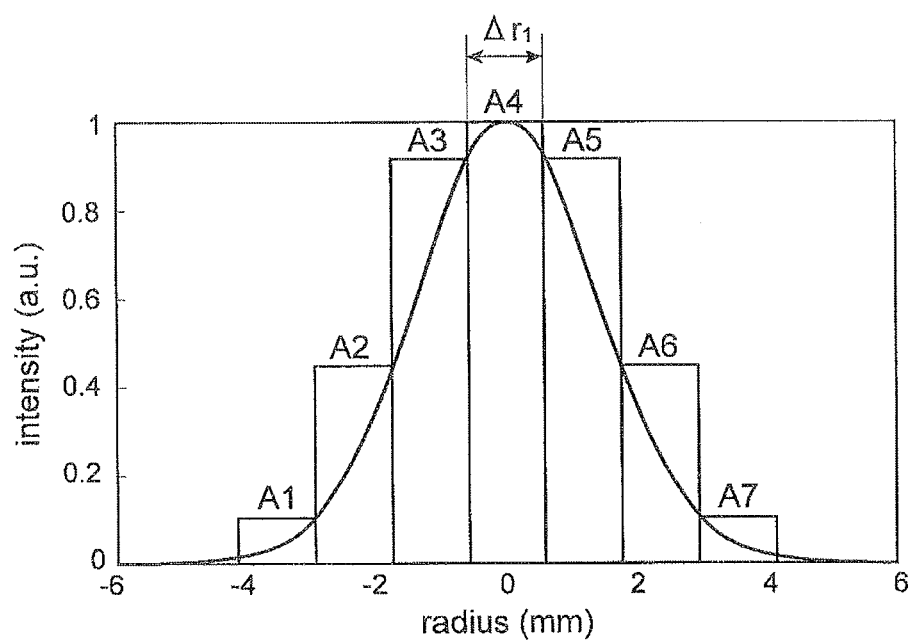
FIG. 5 is a schematic view illustrating a division of intensity distribution of incident laser light in a step of dividing incident light.

Referring to the flowchart of FIG. 2 again, with the incident aspheric lens 11, the measured intensity distribution of the incident laser light Oi is divided at a predetermined distance (width) in a distribution direction into a plurality of incident light division areas (a step of dividing incident light) in step S03. For example, as shown in FIG. 5, the measured intensity distribution of the incident laser light Oi is divided at an equidistance of $\Delta r_1$ into seven incident light division areas A1, A2, A3, A4, A5, A6 and A7.

In turn, with the emitting aspheric lens 12, the intensity distribution of the emitted laser light Oo is divided at a predetermined distance (width) in a distribution direction, so that a plurality of emitted light division areas B1, B2, B3, B4, B5, B6 and B7 are obtained by adjusting the intensity (height) of each of the plurality of incident light division areas A1, A2, A3, A4, A5, A6 or A7 and simultaneously by adjusting the width and the position of the distribution direction of each of the plurality of incident light division areas A1, A2, A3, A4, A5, A6 or A7 according to the desired intensity distribution (a step of dividing emitted light) in step S04. Particularly, the plurality of the emitted light division areas B1, B2, B3, B4, B5, B6 and B7 will be obtained as follows.

Figure 6:
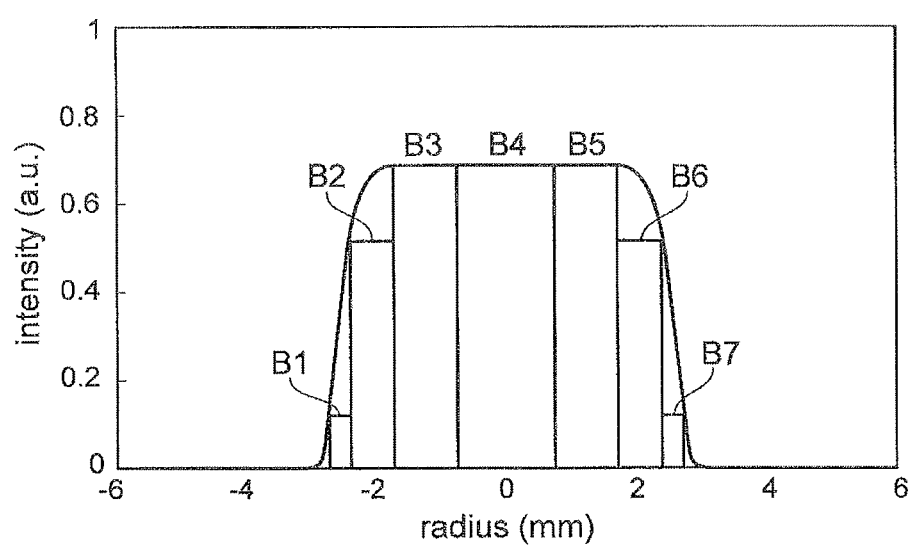
FIG. 6 is a schematic view illustrating a division of a desired intensity distribution of emitted laser light in a step of dividing emitted light.

For example, as shown in FIG. 6, first, the desired intensity distribution of the emitted laser light Oo is divided into the seven emitted light division areas B1, B2, B3, B4, B5, B6 and B7. In the present embodiment, when an adjustment from the Gaussian distribution to the super Gaussian distribution is previously assumed, the desired intensity distribution is divided so that a distance of the emitted light division area B4 located at a center of the light is largest and a distance of the emitted light division area is gradually smaller toward the outer side.

Figure 7:
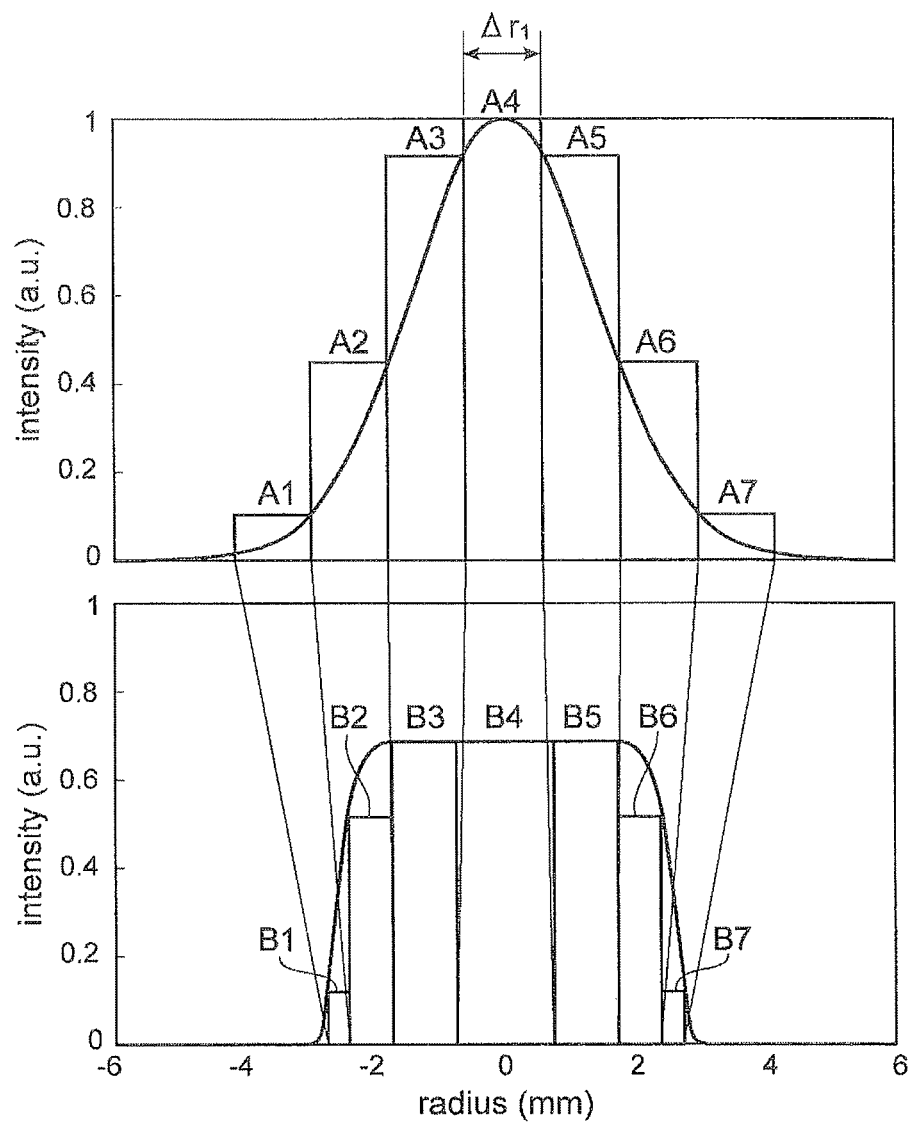
FIG. 7 is a schematic view illustrating a width and a position adjustment from incident light division areas to emitted light division areas in a step of dividing emitted light.

In turn, for example, as shown in FIG. 7, the incident light division areas A1, A2, A3, A4, A5, A6 and A7 and the emitted light division areas B1, B2, B3, B4, B5, B6 and B7 are made to correspond to each other one to one, and a width and a position of each emitted light division area B31, B2, B3, B4, B5, B6 or B7 are adjusted so that energies of the incident division areas A1, A2, A3, A4, A5, A6 and A7 are equal to corresponding energies of the emitted light division areas of B1, B2, B3, B4, B5, B6 and B7, as the intensity (height) increases and decreases.

Figure 8:
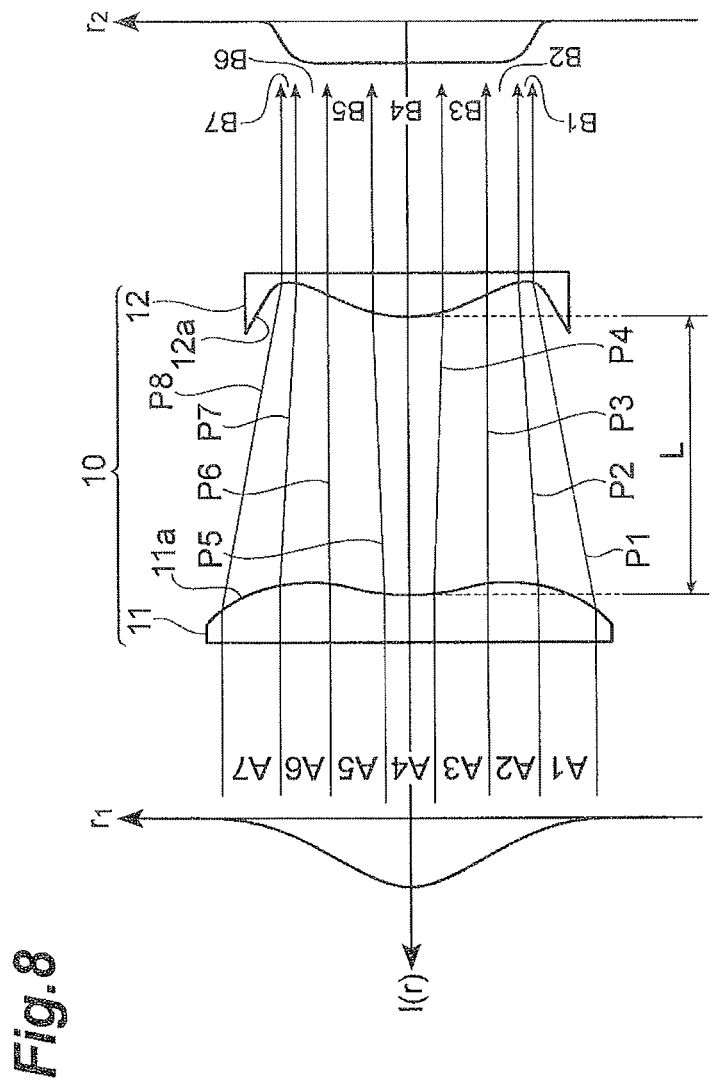
FIG. 8 is a schematic view illustrating light path specifying in a step of specifying light path.

Referring to the flowchart of FIG. 2 again, in turn, with the incident aspheric lens 11, a light path is specified from a position of the distribution direction of the incident light division areas A1, A2, A3, A4, A5, A6 and A7 in the incident aspheric lens 11 and a position of the distribution direction of the emitted light division areas B1, B2, B3, B4, B5, B6 and B7 in the emitting aspheric lens 12 (a step of specifying light path) in step S05. For example, as shown in FIG. 8, a coordinate of a direction of a radius $r_1$ of the incident light division areas A1, A2, A3, A4, A5, A6 and A7 in the incident aspheric lens 11 is connected to a coordinate of a direction of a radius $r_2$ of the corresponding emitted light division areas B1, B2, B3, B4, B5, B6 and B7 in the emitting aspheric lens 12, thereby obtaining light paths P1, P2, P3, P4, P5, P6, P7 and P8 from an aspheric surface 11a of the incident aspheric lens 11 to an aspheric surface 12a of the emitting aspheric lens 12.

Next, aspheric shapes of the pair of the aspheric lenses 11 and 12 are obtained from the obtained light paths P1, P2, P3, P4, P5, P6, P7 and P8 (a step of obtaining shapes) in step S06. Particularly, the aspheric shapes of the pair of the aspheric lenses 11 and 12 will be obtained as follows.

Figure 9:
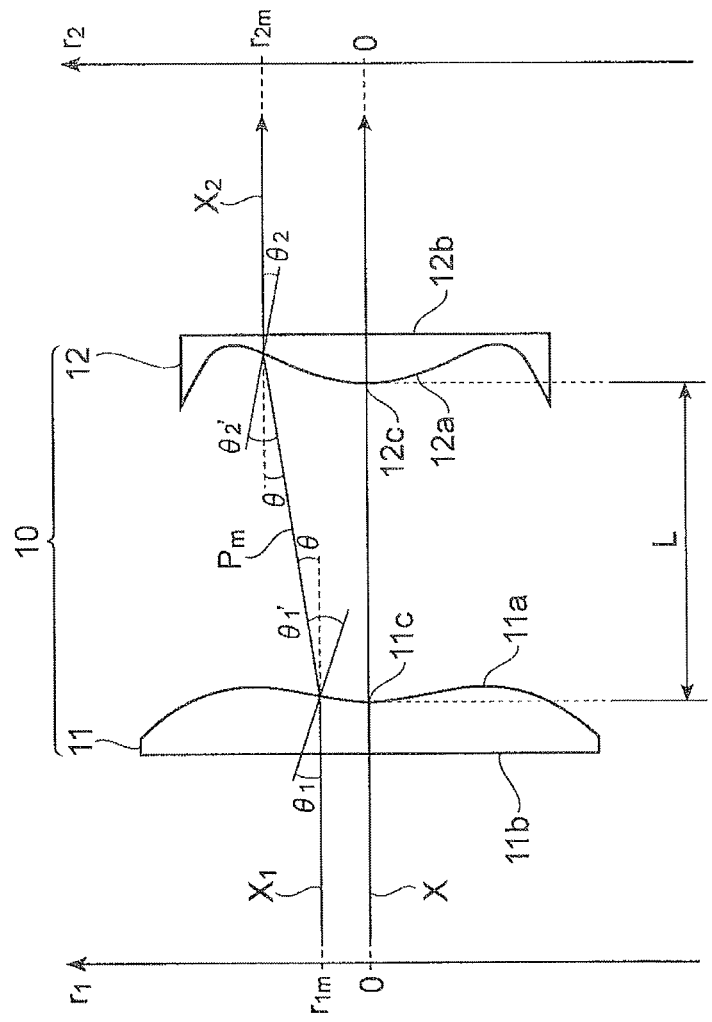
FIG. 9 is a schematic view illustrating shape obtaining in a step of obtaining shapes.

In FIG. 9, in order to help understanding, the incident laser light Oi is introduced at right angles to a plane surface 11b of the incident aspheric lens 11, and the emitted laser light Oo is emitted at right angles to a plane surface 12b of the emitting aspheric lens 12. Further, an $m^{th}$ coordinate on the aspheric surface 11a of the incident aspheric lens 11 is referred to as $r_{1m}$, an corresponding $m^{th}$ coordinate on the aspheric surface 12a of the emitting aspheric lens 12 is referred to as $r_{2m}$, and a light path connecting the coordinate $r_{1m}$ and the coordinate $r_{2m}$ is referred to as $P_m$. Further, an incident angle of the incident laser light Oi for the aspheric surface 11a of the coordinate $r_{1m}$ of the incident aspheric lens 11 is set $\theta_1$, and a refraction angle, i.e., an emission angle of the light path $P_m$ for the aspheric surface 11a is set to $\theta_1'$. Similarly, an incident angle of the light path $P_m$ for the aspheric surface 12a of the coordinate $r_{2m}$ of the emitting aspheric lens 12 is set to $\theta_2'$, and a refraction angle, i.e., an emission angle of the emitted laser light Oo for the aspheric surface 12a is set to $\theta_2$. Further, the angle of the light path $P_m$ to main axes $X_1$ and $X_2$ is set to θ (main axis $X_1$ is a straight line perpendicular to the plane surface 11b at the incident side of the incident aspheric lens 11, and the main axis $X_2$ is a straight line perpendicular to the plane surface 12b at the emitting side of the emitting aspheric lens 12. Further, the main axis $X_1$ and the main axis $X_2$ are parallel). Further, a refractive index of the incident aspheric lens 11 and the emitting aspheric lens 12 is n, and a distance between a point 11c at which the aspheric surface 11a intersects the optical axis X and a point 12c at which the aspheric surface 12a intersects the optical axis X, i.e., a distance between a central position (a position at which coordinate $r_1$=0) of the aspheric surface 11a and a central position (a position at which coordinate $r_2$=0) of the aspheric surface 12a is L.

For example, firstly, the angle θ of the light path $P_m$ to the main axes $X_1$ and $X_2$ is indicated by Equation (5) below.

$$\theta = \tan^{-1}\left(\frac{r_{2m} - r_{1m}}{L}\right) \quad (5)$$

Further, below Equation (6) is established by Snell's law, and thus the incident angle $\theta_1$ of the incident laser light to the aspheric surface 11a of the incident aspheric lens 11 is obtained by Equation (7) below.

$$n \times \sin\theta_1 = \sin(\theta_1 + \theta) \quad (6)$$

$$\theta_1 = \pm\cos^{-1}\left\{\pm\sqrt{\frac{n^2 - 2n\times\cos\theta + \cos^2\theta}{n^2 - 2n\times\cos\theta + \cos^2\theta + \sin^2\theta}}\right\} \quad (7)$$

Figure 10:
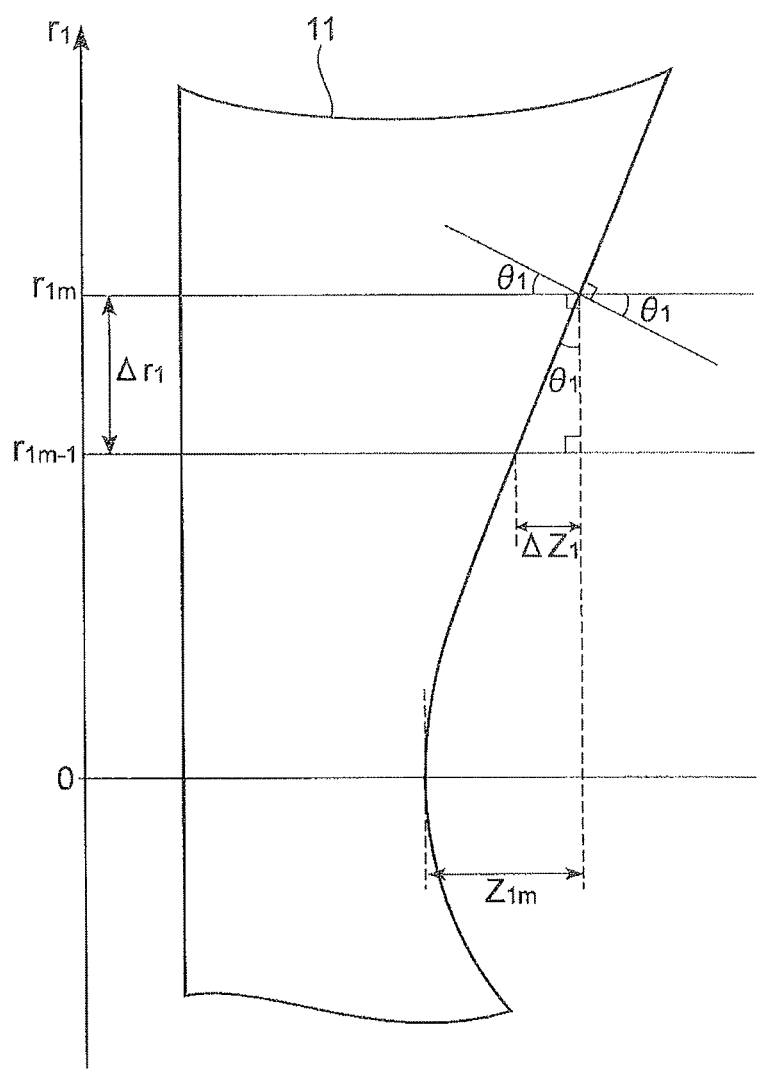
FIG. 10 is an enlarged view illustrating an incident aspheric lens in FIG. 9.

Here, a neighborhood of the coordinate $r_{1m}$ of the incident aspheric lens 11 of FIG. 9 is enlarged, and is shown in FIG. 10. In FIG. 10, a $(m-1)^{th}$ coordinate neighboring the coordinate $r_{1m}$ on the aspheric surface 11a of the incident aspheric lens 11 is defined as $r_{1m-1}$. As shown in FIG. 10, accordingly, with the incident aspheric lens 11, a difference $\Delta Z_1$ of elevation of the aspheric surface 11a between the coordinate $r_{1m}$ and the coordinate $r_{1m-1}$ neighboring the coordinate $r_{1m}$ is indicated by Equation (8) below.

$$\Delta Z_1 = (r_{1m} - r_{1m-1}) \times \tan\theta_1 = \Delta r_1 \times \tan\theta_1 \quad (8)$$

With the incident aspheric lens 11, a difference $Z_{1m}$ of elevation of the aspheric surface 11a between the coordinate $r_{1m}$ and the central position (coordinate $r_1=0$) is obtained by Equation (9) below.

$$Z_{1m} = \sum_0^m \Delta Z_1 \quad (9)$$

Figure 11:
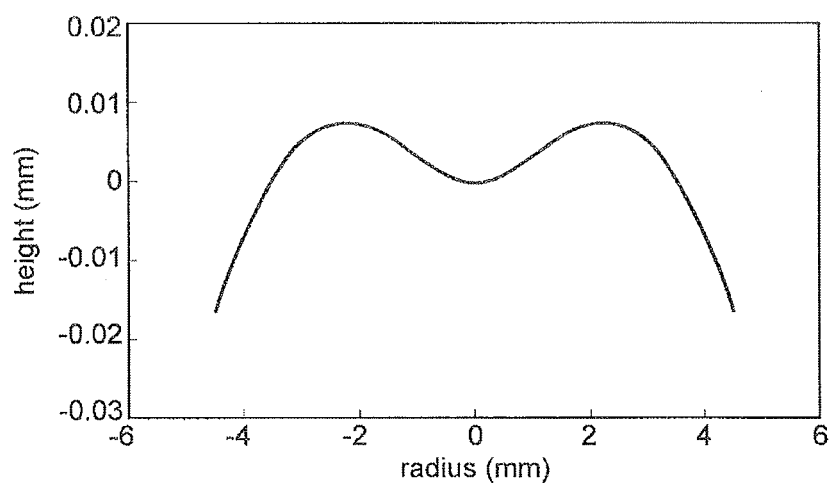
FIG. 11 is a view illustrating an example of a shape of an incident aspheric lens which is obtained in the step of obtaining shapes.

These operations are performed for all coordinates, i.e., all incident light division areas A1, A2, A3, A4, A5, A6 and A7 and the light paths P1, P2, P3, P4, P5, P6, P7 and P8, so that a shape of the aspheric surface 11a of the incident aspheric lens 11 for shaping the intensity distribution of the incident laser light into the desired intensity distribution is obtained as shown in FIG. 11.

Referring to FIG. 9, similarly, according to Snell's law, the emitting angle $\theta_2$ of the emitted laser light to the aspheric surface 12a of the emitting aspheric lens 12 is obtained by Equation (10) below.

$$\theta_2 = \pm\cos^{-1}\left\{\pm\sqrt{\frac{n^2 - 2n\times\cos\theta + \cos^2\theta}{n^2 - 2n\times\cos\theta + \cos^2\theta + \sin^2\theta}}\right\} \quad (10)$$

Figure 12:
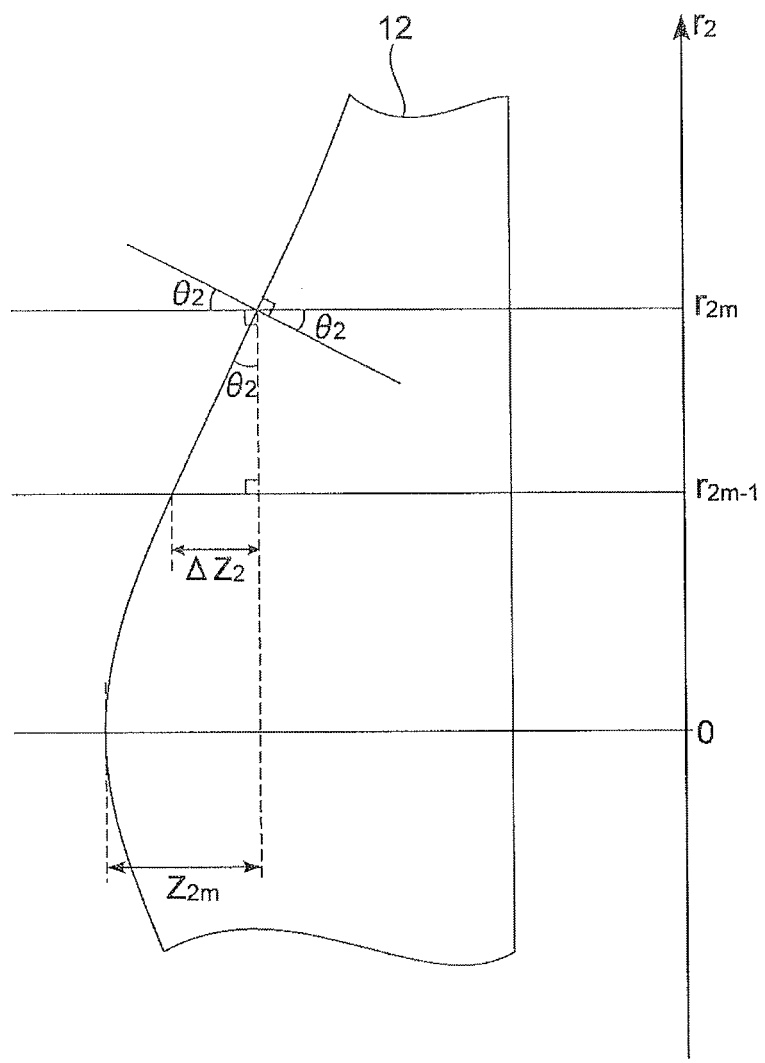
FIG. 12 is an enlarged view illustrating an emitting aspheric lens in FIG. 9.

Here, a neighborhood of the coordinate $r_{2m}$ of the emitting aspheric lens 12 of FIG. 9 is enlarged, and is shown in FIG. 12. In FIG. 12, a $(m-1)^{th}$ coordinate neighboring the coordinate $r_{2m}$ on the aspheric surface 12a of the emitting aspheric lens 12 is defined as $r_{2m-1}$. As shown in FIG. 12, accordingly, with the emitting aspheric lens 12, a difference $\Delta Z_2$ of elevation of the aspheric surface 12a between the coordinate $r_{2m}$ and the coordinate $r_{2m-1}$ neighboring the coordinate $r_{2m}$ is indicated by Equation (11) below.

$$\Delta Z_2 = (r_{2m} - r_{2m-1}) \times \tan\theta_2 \quad (11)$$

With the emitting aspheric lens 12, a difference $Z_{2m}$ of elevation of the aspheric surface 12a between the coordinate $r_{2m}$ and the central position (coordinate $r_2=0$) is obtained by Equation (12) below.

$$Z_{2m} = \sum_0^m \Delta Z_2 \quad (12)$$

These operations are performed for all emitted light division areas B1, B2, B3, B4, B5, B6 and B7 and the light paths P1, P2, P3, P4, P5, P6, P7 and P8, thereby obtaining a shape of the aspheric surface 12a of the emitting aspheric lens 12 for being in phase of the laser light shaped into the desired intensity distribution by the incident aspheric lens 11 and generating the emitted laser light changed to parallel light.

Figure 13:
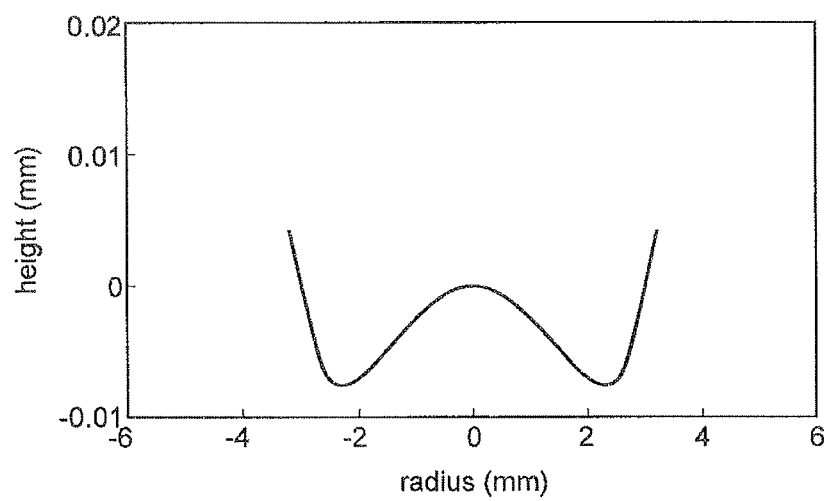
FIG. 13 is a view illustrating an example of a shape of an emitting aspheric lens which is obtained in the step of obtaining shapes.

Referring to the flowchart of FIG. 2, in turn, based on the shape shown in FIG. 11, the aspheric surface 11a of the incident aspheric lens 11 is formed, and based on the shape of FIG. 13, the aspheric surface 12a of the emitting aspheric lens 12 is formed (a step of forming) in step S07. For example, since the shapes of the aspheric surface 11a and 12a are identified by aspheric Equation, an approximation of a high-order polynomial (aspheric equation) for the shapes of FIGS. 11 and 13 is performed, and based on the high-order polynomial, the aspheric surface 11a and 12a are formed.

As described above, according to the method of designing and manufacturing the optical component for shaping the laser light of first comparison example, the intention distribution of the incident laser light Oi is measured, and based on the measured intensity distribution, the shapes of the pair of the aspheric lenses 11 and 12 is designed. Further, the plurality of incident light division areas A1, A2, A3, A4, A5, A6 and A7 in which the measured intensity distribution of the incident laser light Oi is divided are obtained, and a plurality of emitted light division areas B1, B2, B3, B4, B5, B6 and B7 in which the intensity (height) of each of the plurality of incident light division areas A1, A2, A3, A4, A5, A6 and A7 is adjusted while the width and the position thereof is adjusted according to the desired intensity distribution of the emitted laser light are obtained, and the light paths P1, P2, P3, P4, P5, P6, P7 and P8 are specified from positions of the plurality of the incident light division areas A1, A2, A3, A4, A5, A6 and A7 in the incident light aspheric lens 11, and corresponding positions of the plurality of the emitting light division areas B1, B2, B3, B4, B5, B6 and B7 in the emitting aspheric lens 12. Then, based on the light paths P1, P2, P3, P4, P5, P6, P7 and P8, the shapes of the pair of the aspheric lenses 11 and 12 is designed. Accordingly, it is possible to obtain the optical component for shaping the laser light, which is capable of shaping the intensity distribution of the laser light into the predetermined intensity distribution at a high precision.

Figure 14:
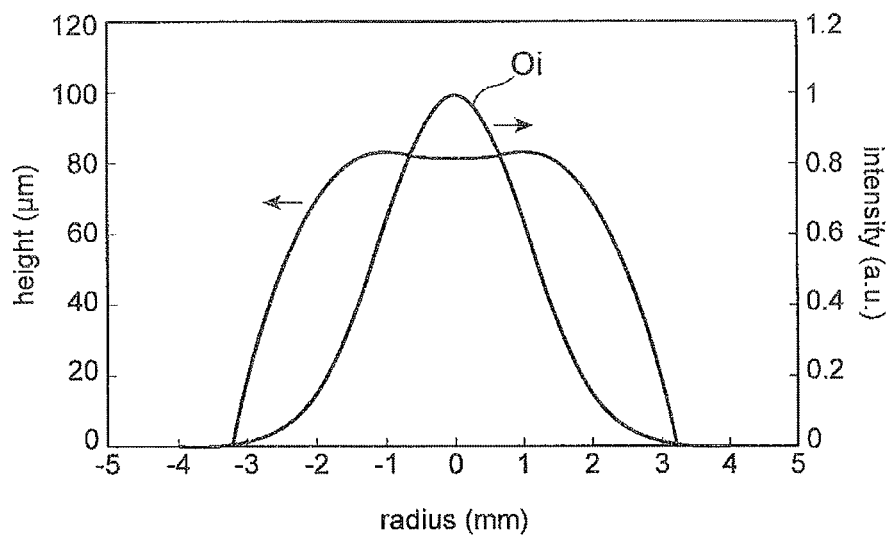
FIG. 14 is a view illustrating an example of intensity distribution of incident laser light, and an example of a shape of an incident aspheric lens which is obtained in the step of obtaining shapes.
Figure 15:
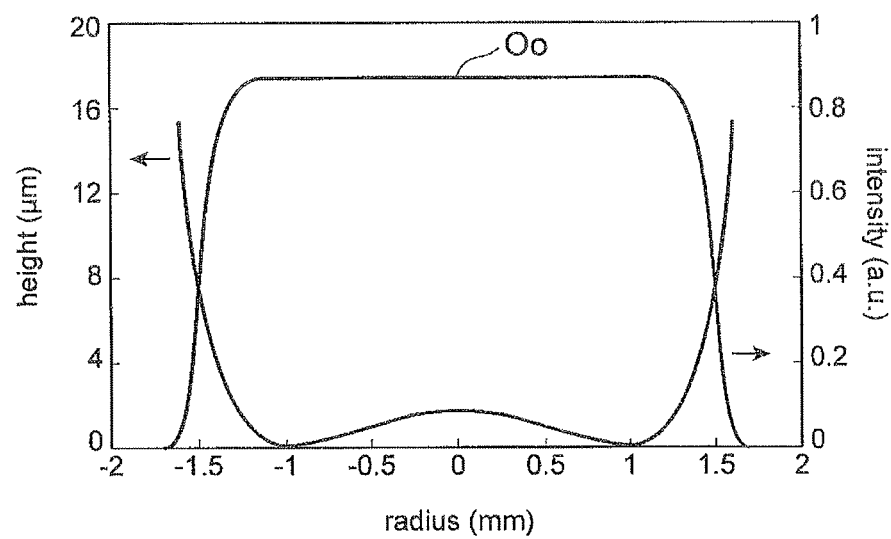
FIG. 15 is a view illustrating an example of a desired intensity distribution of emitted laser light, and an example of a shape of an emitting aspheric lens which is obtained in the step of obtaining shapes.

Hereinafter, the method of designing and manufacturing the optical component for shaping the laser light of the first comparative example is verified. For example, the incident laser light Oi (parallel light) with the intensity distribution which is the Gaussian distribution (a wavelength is 1064 nm, and a diameter of a beam is 4.0975 mmat $1/e^2$) as shown in FIG. 14 is regarded as the emitted laser light Oo with a spatially even intensity distribution as shown in FIG. 15. In this case, according to the method of designing the above-mentioned aspheric shape, the aspheric shape of the incident aspheric lens 11 is obtained as shown in FIG. 14, and the aspheric shape of the emitting aspheric lens 12 is obtained as shown in FIG. 14.

Further, FIGS. 14 and 15 show an example designed in that $MgF_2$ (n=1.377) is used as a material of the aspheric lenses 11 and 12, and a distance L between a center position (a position of the coordinate $r_1$=0) of the aspheric surface 11a and a center position (a position of the coordinate $r_2$=0) is 50 mm. Further, in FIGS. 14 and 15, in order to make a difference of elevation of aspheric surface clear, a longitudinal reference (a position at which a height is 0 µm) is made to be different from a center (a position at which a coordinate $r_1$=$r_2$=0) of the aspheric lenses 11 and 12.

If an approximation of a high-order polynomial for the shape of the aspheric surface 11a of the incident aspheric lens 11 shown in FIG. 14 and the shape of the aspheric surface 12a of the emitted aspheric lens 12 shown in FIG. 5 is performed, a high-order polynomial $Z_1(r)$ of the shape (a height of the aspheric surface) of the aspheric surface 11a and a high-order polynomial $Z_2(r)$ of the shape (a height of the aspheric surface) of the aspheric surface 12a are indicated by Equations 13 and 14, respectively (a unit of a radius r is mm).

$$Z_1(r) = Z_0 + \frac{cr^2}{1+\sqrt{1-(1+K)c^2r^2}} + \alpha_1 r^4 + \alpha_2 r^6 + \alpha_3 r^8 + \alpha_4 r^{10} + \alpha_5 r^{12} + \alpha_6 r^{14} + \alpha_7 r^{16} + \alpha_8 r^{18} + \alpha_9 r^{20} \quad (13)$$

$Z_0 = 0.0813686145668832$,
$c = 0.00777733881349394$,
$K = 0$,
$\alpha_1 = -0.00241229368324484$,
$\alpha_2 = 0.000234942586627072$,
$\alpha_3 = -0.0000275885138454212$,
$\alpha_4 = 0.0000063299148495522$,
$\alpha_5 = -1.36808383766256\ E\text{-}06$,
$\alpha_6 = 1.86570409257993\ E\text{-}07$,
$\alpha_7 = -1.50639871979035\ E\text{-}08$,
$\alpha_8 = 6.65228450030865\ E\text{-}10$,
$\alpha_9 = -1.24283263164959\ E\text{-}11$ $$Z_2(r) = Z_0 + \frac{cr^2}{1+\sqrt{1-(1+K)c^2r^2}} + \alpha_1 r^4 + \alpha_2 r^6 + \alpha_3 r^8 + \alpha_4 r^{10} + \alpha_5 r^{12} + \alpha_6 r^{14} + \alpha_7 r^{18} + \alpha_9 r^{20} \quad (14)$$

Figure 16:
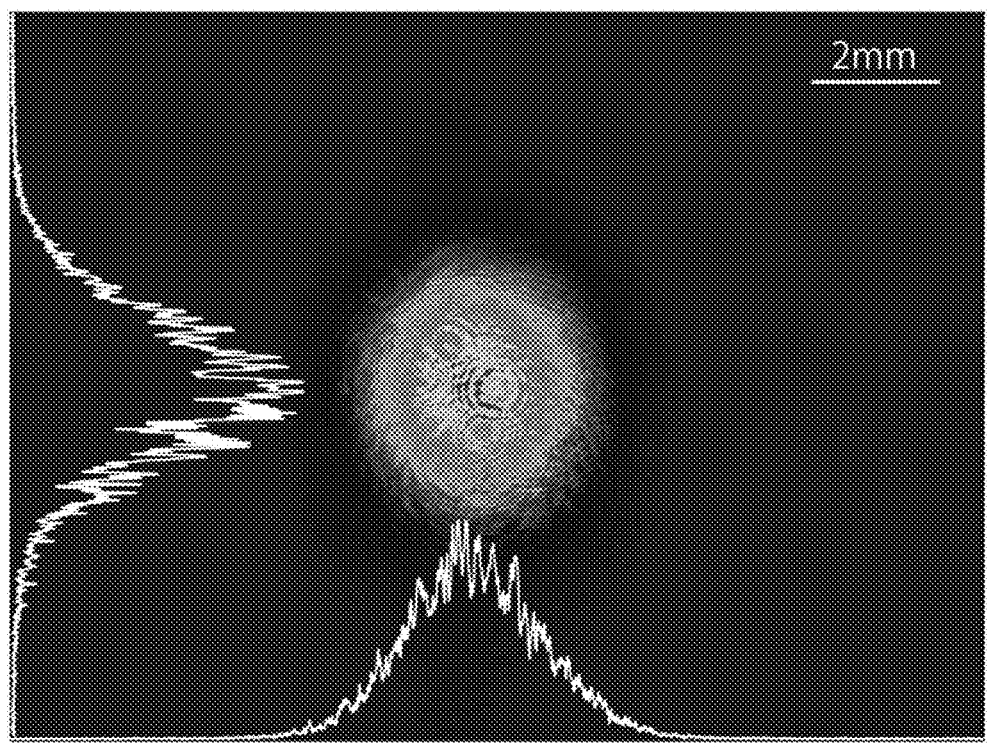
FIG. 16 is a view illustrating a result of measuring intensity distribution of incident laser light of a homogenizer shown in FIGS. 14 and 15.
Figure 17:
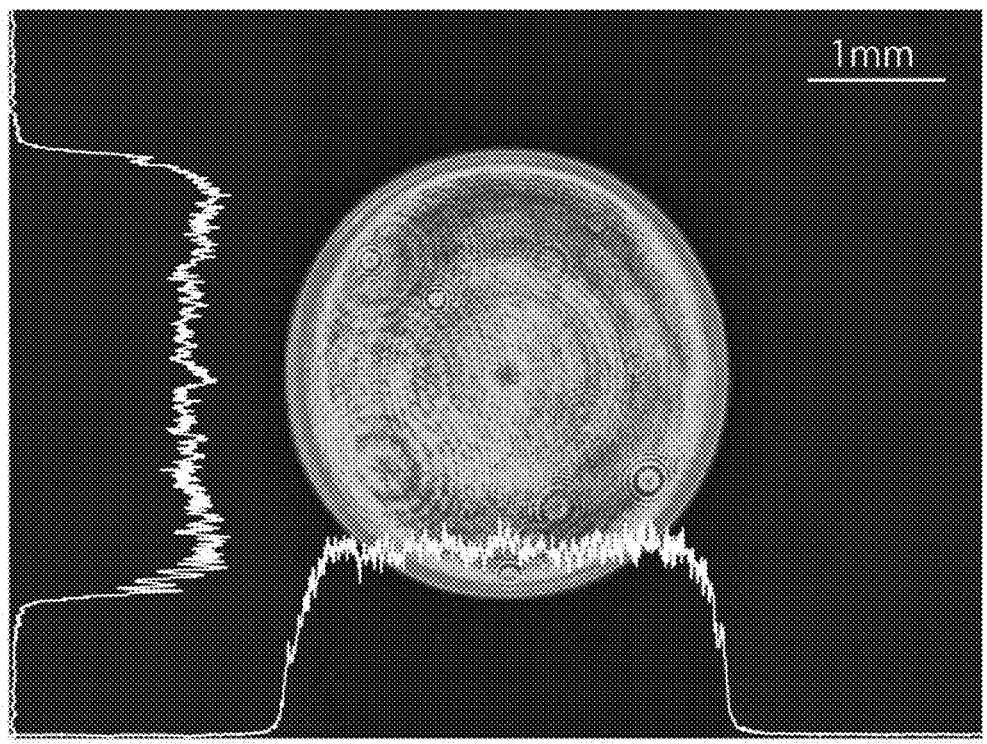
FIG. 17 is a view illustrating a result of measuring intensity distribution of emitted laser light of a homogenizer shown in FIGS. 14 and 15.

$Z_0 = 0.00170530995281016$,
$c = -0.00675475280492833$,
$K = 0$,
$\alpha_1 = 0.00119250802891454$,
$\alpha_2 = 0.000234942586627072$,
$\alpha_3 = -0.0000275885138454212$,
$\alpha_4 = 0.0000063299148495522$,
$\alpha_5 = -1.36808383766256\ E\text{-}06$,
$\alpha_6 = 1.86570409257993\ E\text{-}07$,
$\alpha_7 = -1.5063987197979035\ E\text{-}08$,
$\alpha_8 = 6.65228450030865\ E\text{-}10$,
$\alpha_9 = -1.24283263164959\ E\text{-}11$ Based on these high-order polynomials $Z_1(r)$ and $Z_2(r)$, the pair of the aspheric lenses 11 and 12 are manufactured, and an estimation of the properties are performed. FIG. 16 is a measured result of a spatial mode (intention distribution) of the laser light introduced into the incident aspheric lens 11, and FIG. 17 is a measured result of a spatial mode (intention distribution) of the laser light introduced into the emitting aspheric lens 12. According to the pair of the aspheric lenses 11 and 12 of the comparison example, it is identified the intensity distribution is preferably shaped in a spatially even intention distribution.

Second Comparative Example

Although the method of designing and manufacturing the homogenizer for changing parallel light into parallel light has been exemplarily illustrated in the first comparative example, the designing and manufacturing method according to the first comparative example is applicable to a method of designing and manufacturing a homogenizer for changing non-parallel light (incident laser light with a divergence angle) into non-parallel light (emitted laser light with a divergence angle). As described above, in the case of designing the homogenizer for the incident laser light with a divergence angle, the divergence angle of the incident laser light as well as the intensity distribution of the incident laser light is measured, and a shape of the aspheric lens is obtained based on the measured intensity distribution and the divergence angle. Further, in the case of designing a homogenizer for the emitted laser light with the divergence angle, a desired divergence angle of the emitted laser light as well as the desired intensity distribution of the emitted laser light is set, and a shape of the aspheric lens is obtained based on the set and desired intensity distribution and the desired divergence angle. Hereinafter, a method of designing and manufacturing a homogenizer according to a second comparative example, for changing incident laser light Oi of non-parallel light into emitted laser light Oo of non-parallel light, will be described.

Figure 18:
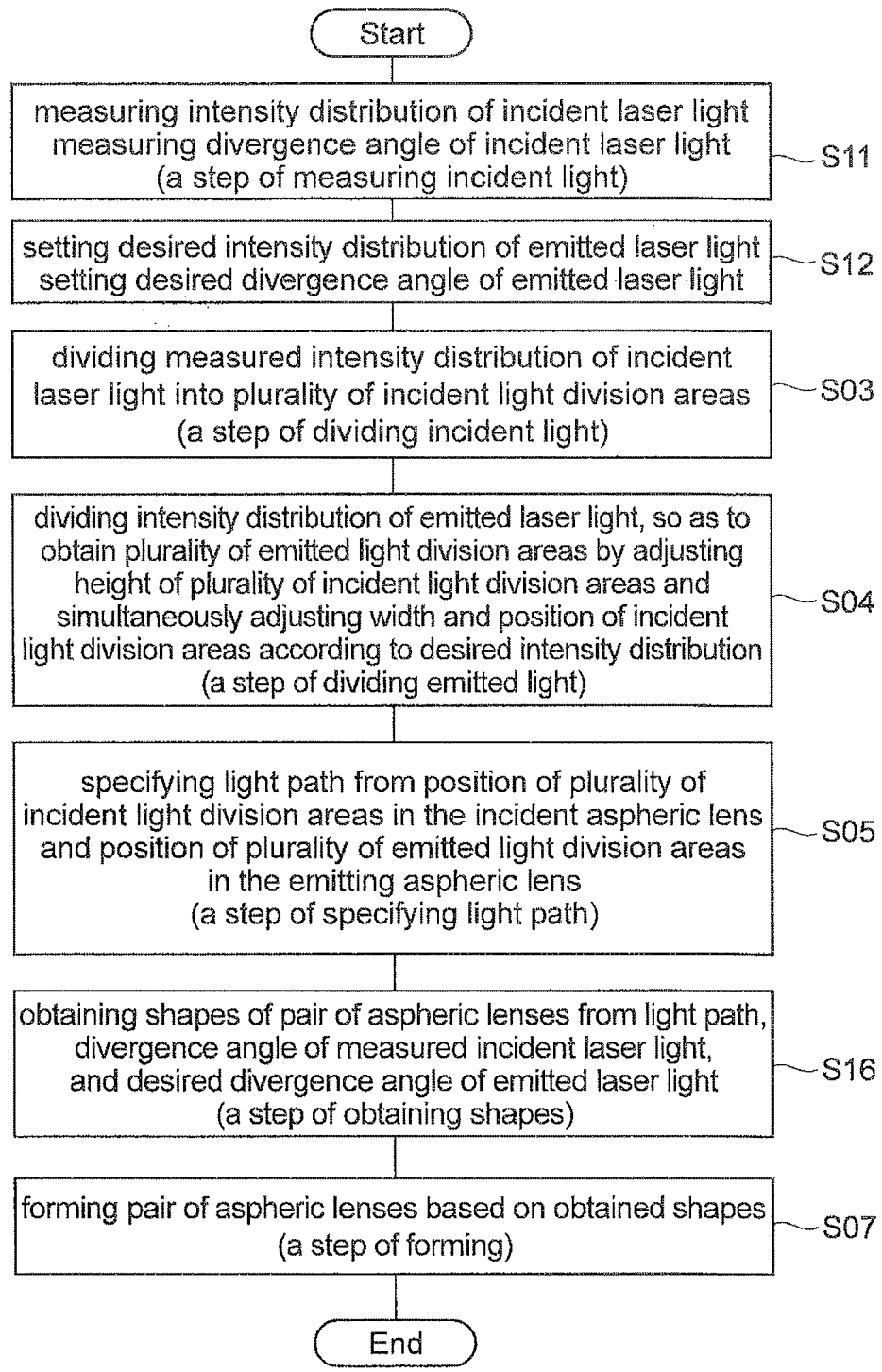
FIG. 18 is a flowchart illustrating a process of designing and manufacturing the homogenizer according to a second comparison example.

FIG. 18 is a flowchart illustrating the process of designing and manufacturing the homogenizer according to the second comparative example. The method of designing and manufacturing the homogenizer of the second comparative example is different from the method of designing and manufacturing the homogenizer of the first comparative example shown FIG. 2, in view of performing processes of steps S11 (a step of measuring incident light), step S12, and step S16 (a step of obtaining shapes) instead of the processes of step S01 (a step of measuring incident light), step S02, and step S06 (a step of obtaining shapes).

In step S11, the intensity distribution of the incident laser light is measured, similarly to the above mentioned step S01. Further, in step S11, a divergence angle of the incident laser light is measured. In step S12, a desired intensity distribution of emitted laser light is set, similarly to the above mentioned step S02. Furthermore, in step S12, a desired divergence angle of the emitted laser light is set. In step S16, aspheric shapes of a pair of aspheric lenses 11 and 12 is obtained based on a measured divergence angle of incident laser light and a desired divergence angle of emitted laser light, in addition to the obtained light path. Particularly, the aspheric shapes of the pair of the aspheric lenses 11 and 12 will be obtained as follows.

Figure 19:
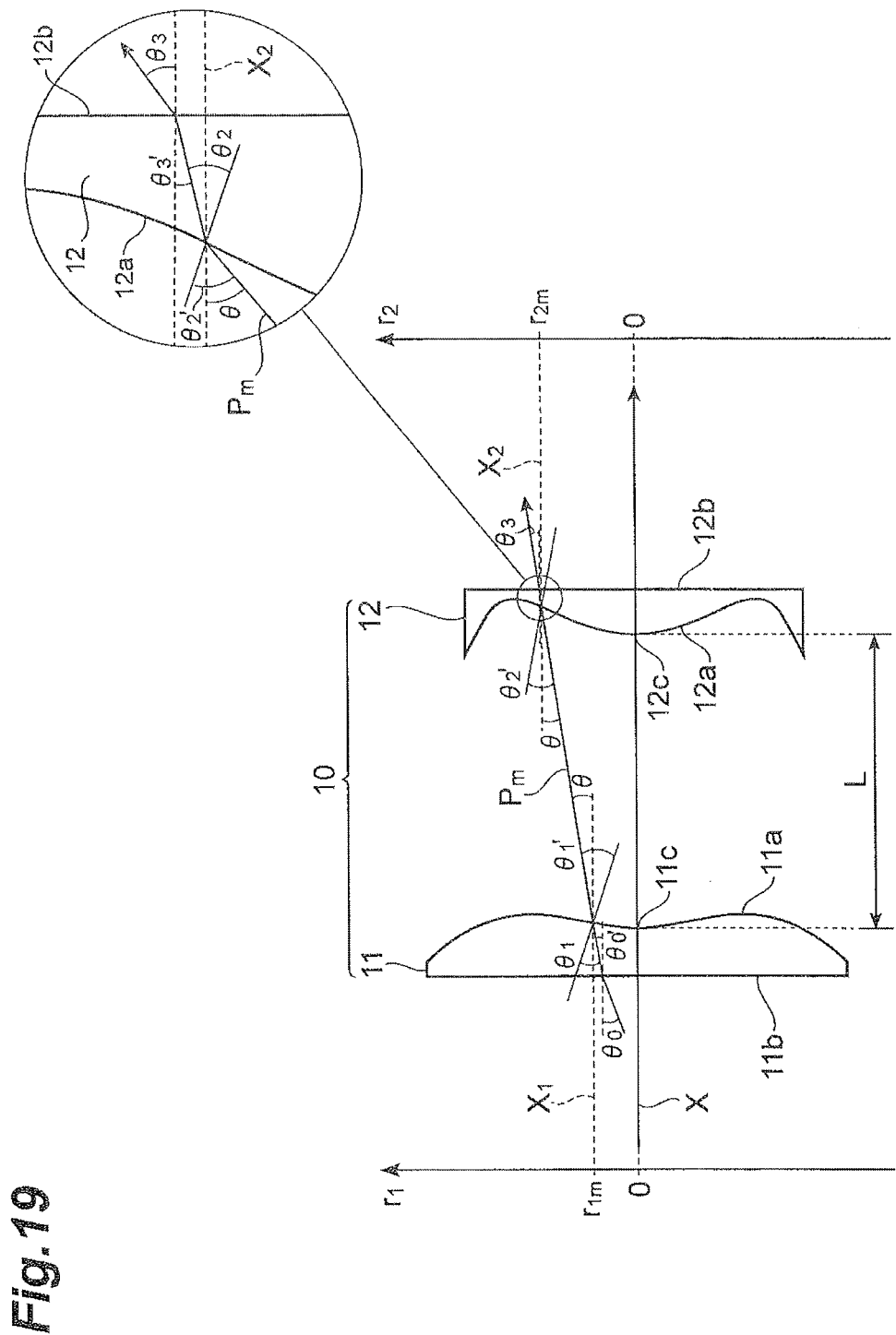
FIG. 19 is a schematic view illustrating shape obtaining in a step of obtaining shapes.

In FIG. 19, with respect to FIG. 9, the incident laser light with a divergence angle is introduced at non-right angles to a plane surface 11b of the incident aspheric lens 11, and the emitted laser light with a divergence angle is emitted at non-right angles to a plane surface 12b of the emitting aspheric lens 12. Here, an incident angle of the incident laser light, which corresponds to a $m^{th}$ light path $P_m$, to a plane surface 11b of the incident aspheric lens 11 is referred to as $\theta_0$, and a refraction angle thereof is referred to as $\theta_0'$. Similarly, an incident angle of laser light, which is laser light refracted by aspheric surface 12a of an emitting aspheric lens 12 corresponding to the $m^{th}$ light path $P_m$, to a plane surface 12b of the emitting aspheric lens 12 is referred to as $\theta_3'$, and a refraction angle, i.e., an emitted angle of the emitted laser light to the plane surface 12$b$ is referred to as $\theta_3$. Other parameters in FIG. 19 are identical to parameters in FIG. 9. Further, in FIG. 19, a neighborhood of a coordinate $r_{2m}$ of the emitting aspheric lens 12 is enlarged and shown.

For example, first, an angle $\theta$ which the light path $P_m$ for the main axes $X_1$ and $X_2$ makes is indicated by Equation (5). Further, Equations (15) and (16) are established by Snell's law, and an incident angle $\theta_1$ of the incident laser light for the aspheric surface 11$a$ of the incident aspheric laser lens 11, which is the incident laser light refracted by the plane surface 11$b$ of the incident aspheric lens 11, is obtained by Equation (17).

$$\sin\theta_0 = n \times \sin\theta_0' \tag{15}$$

$$n \times \sin(\theta_1 + \theta_0') = \sin(\theta_1 + \theta) \tag{16}$$

$$\theta_1 = \pm \cos^{-1}\left\{\pm\sqrt{\frac{N_1}{D_1}}\right\} \tag{17}$$

$$N_1 = n^4 - 2n^2\cos^2\theta + \cos^4\theta + n^2\sin^2\theta + \cos^2\theta\sin^2\theta -$$
$$2n^2\sin\theta\sin\theta_0 - 2\cos^2\theta\sin\theta\sin\theta_0 - n^2\sin^2\theta_0 + 3\cos^2\theta\sin^2\theta_0 -$$
$$\sin^2\theta\sin^2\theta_0 + 2\sin\theta\sin^3\theta_0 - 2n\cos\theta\sin^2\theta\sqrt{\frac{n^2-\sin^2\theta_0}{n^2}} +$$
$$4n\cos\theta\sin\theta\sin\theta_0\sqrt{\frac{n^2-\sin^2\theta_0}{n^2}} - 2n\cos\theta\sin^2\theta_0\sqrt{\frac{n^2-\sin^2\theta_0}{n^2}}$$
$$D_1 = n^4 - 2n^2\cos^2\theta + \cos^4\theta + 2n^2\sin^2\theta + 2\cos^2\theta\sin^2\theta +$$
$$\sin^4\theta - 4n^2\sin\theta\sin\theta_0 - 4\cos^2\theta\sin\theta\sin\theta_0 -$$
$$4\sin^3\theta\sin\theta_0 + 4\cos^2\theta\sin^2\theta_0 + 4\sin^2\theta\sin^2\theta_0$$

Here, the incident angle $\theta$ of the incident laser light for the plane surface 11$b$ of the incident aspheric lens 11 corresponds to the measured divergence angle of the incident laser light. Accordingly, according to Equation (17), an incident angle $\theta_1$ of incident laser light refracted to aspheric surface 11$a$ of the incident aspheric lens 11 may be obtained from an angle $\theta$ which the light path $P_m$ makes with respect to the main axis $X_1$, and the measured divergence angle $\theta_0$ of the incident laser light.

In step S16, further, Equation (17) is used instead of Equation (7) in the above mentioned step S06. Similarly to the above-mentioned embodiment, accordingly, it is possible to obtain a shape of aspheric surface 11$a$ of the incident aspheric lens 11 for shaping the intensity distribution of the incident laser light with a divergence angle into a desired intensity distribution, based on Equations (8) and (9).

Similarly, a refraction angle $\theta_2$ of the light path $P_m$ for the aspheric surface 12$a$ of the emitting aspheric lens 12 is obtained by Equation (18) according to Snell's law.

$$\theta_2 = \pm \cos^{-1}\left\{\pm\sqrt{\frac{N_2}{D_2}}\right\} \tag{18}$$

$$N_2 = n^4 - 2n^2\cos^2\theta + \cos^4\theta + n^2\sin^2\theta + \cos^2\theta\sin^2\theta -$$
$$2n^2\sin\theta\sin\theta_3 - 2\cos^2\theta\sin\theta\sin\theta_3 - n^2\sin^2\theta_3 + 3\cos^2\theta\sin^2\theta_3 -$$
$$\sin^2\theta\sin^2\theta_3 + 2\sin\theta\sin^3\theta_3 - 2n\cos\theta\sin^2\theta\sqrt{\frac{n^2-\sin^2\theta_3}{n^2}} +$$
$$4n\cos\theta\sin\theta\sin\theta_3\sqrt{\frac{n^2-\sin^2\theta_3}{n^2}} - 2n\cos\theta\sin^2\theta_3\sqrt{\frac{n^2-\sin^2\theta_3}{n^2}}$$

-continued
$$D_2 = n^4 - 2n^2\cos^2\theta + \cos^4\theta + 2n^2\sin^2\theta + 2\cos^2\theta\sin^2\theta +$$
$$\sin^4\theta - 4n^2\sin\theta\sin\theta_3 - 4\cos^2\theta\sin\theta\sin\theta_3 -$$
$$4\sin^3\theta\sin\theta_3 + 4\cos^2\theta\sin^2\theta_3 + 4\sin^2\theta\sin^2\theta_3$$

Here, an emitted angle $\theta_3$ of the emitted laser light for the plane surface 12$b$ of the emitting aspheric lens 12 corresponds to the desired divergence angle of the emitted laser light. Therefore, according to Equation (18), a refraction angle $\theta_2$ of the light path $P_m$ for the aspheric surface 12$a$ of the emitting aspheric lens 12 may be obtained from an angle $\theta$ which the light path $P_m$ makes with respect to the main axis $X_2$, and the desired divergence angle $\theta_3$ of the emitted laser light.

In step S16, further, Equation (18) is used instead of Equation (10) in the above mentioned step S06. Similarly to the above-mentioned embodiment, accordingly, a shape of the aspheric 12$a$ of the emitting aspheric lens 12 for being in phase of the laser light shaped into the desired intensity distribution by the incident aspheric lens 11 and generating the emitted laser light with a desired divergence angle may be obtained by above Equation (11) and (12).

Furthermore, if the incident laser light is made into parallel light, i.e., $\theta_3 = \theta_3' = 0$ in Equation (15), Equation (15) is equal to Equation (7), and if the emitted laser light is made into parallel light, i.e., $\theta_3 = \theta_3' = 0$ in Equation (16), Equation (16) becomes Equation (10).

As described above, according to the method of designing and manufacturing an optical component for shaping laser light of the second comparative example, although the incident laser light is non-parallel light with a divergence angle, and also if the emitted laser light which is non-parallel light with a predetermined divergence angle is desired to be obtained, it is possible to obtain an optical component for shaping laser light, which is capable of shaping the intensity distribution of the laser light into a predetermined intensity distribution at a higher precision.

Figure 21:
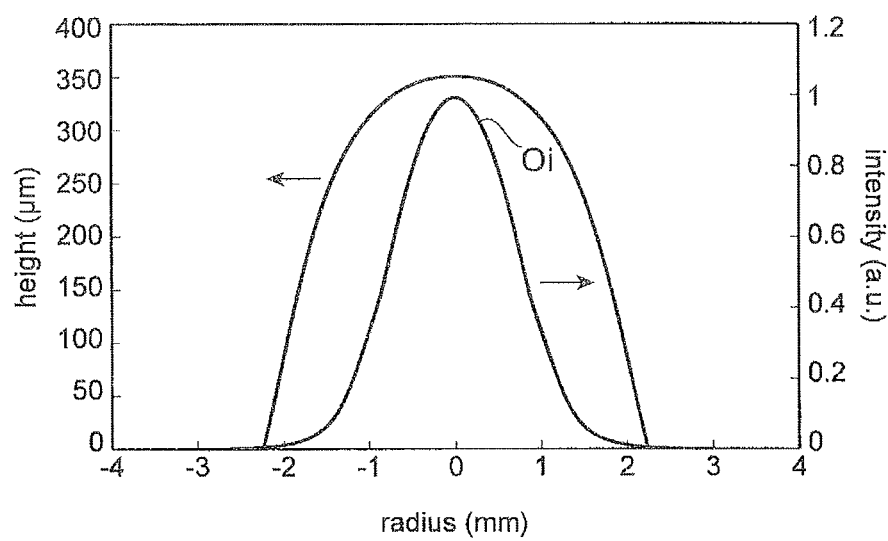
FIG. 21 is a view illustrating an example of intensity distribution of incident laser light, and an example of a shape of an incident aspheric lens which is obtained in the step of obtaining shapes.
Figure 22:
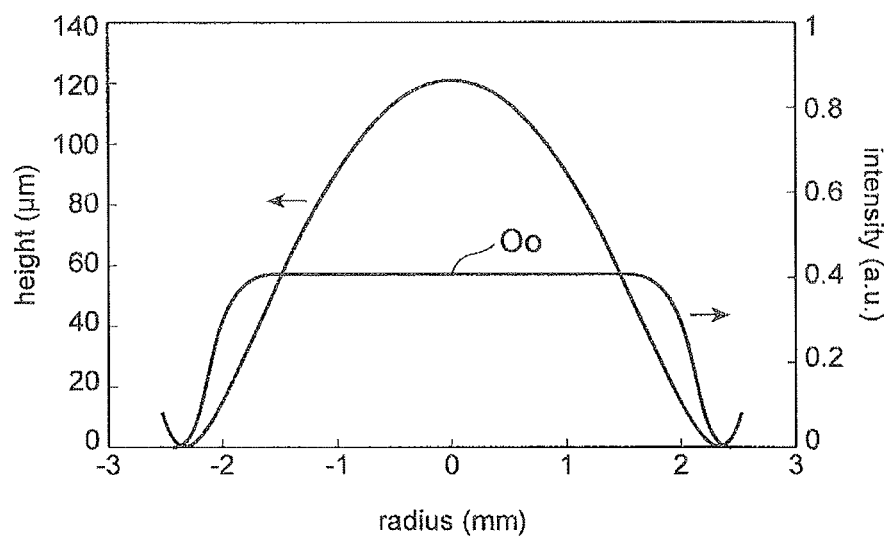
FIG. 22 is a view illustrating an example of desired intensity distribution of emitted laser light, and an example of a shape of an emitting aspheric lens which is obtained in the step of obtaining shapes.

Hereinafter, the method of designing and manufacturing the optical component for shaping the laser light of the second comparative will be verified. For example, as shown in FIG. 21, incident laser light Oi (non-parallel light, a wavelength 658 nm), which has intensity distribution which is the Gaussian distribution of a concentric circle, and is diffused as shown in FIG. 20, is regarded as the emitted laser light Oo with spatially even intensity distribution as shown in FIG. 22.

Figure 20:
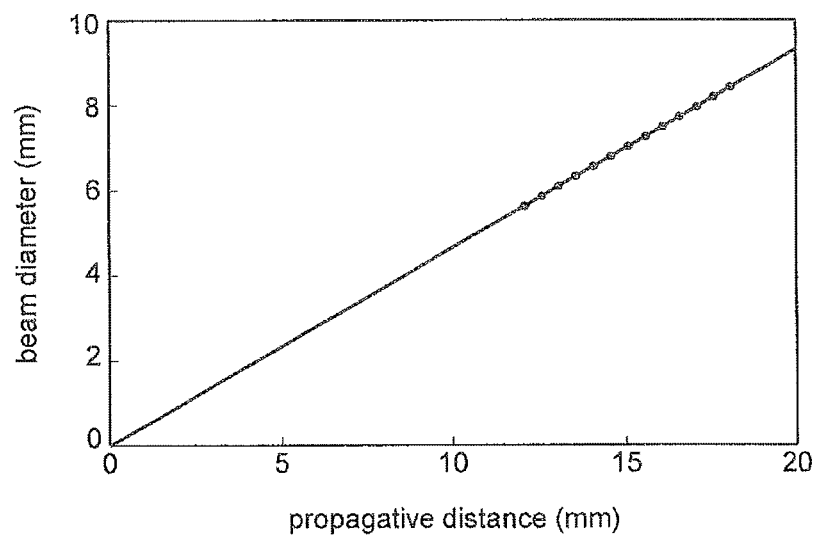
FIG. 20 is a view illustrating a result of measuring a radius of a beam to a propagated distance of incident laser light with a divergence angle.

In FIG. 20, a measured value of a beam diameter (1/$e^2$) for a propagative distance from a light generating point is shown by a point. A fitting function of the measured value is indicated by Equation (19), and shown by a line in FIG. 20.

$$y = 4.671138151834110E{-}01x \tag{19}$$

Therefore, the beam diameter at a position of a propagative distance of 10 mm is assumed as 4.67 mm (1/$e^2$).

In the case that the incident aspheric lens 11 is disposed at this position, according to the method of designing the above-mentioned aspheric shape, as shown in FIG. 21, the aspheric shape of the incident aspheric lens 11 is obtained, and as shown in FIG. 22, the shape of the emitting aspheric lens 12 is obtained.

Further, FIGS. 21 and 22 show an example in which $MgF_2$ (n=1.377) is used as a material of the aspheric lenses 11 and 12, and a distance between a center position (a position at which a coordinate $r_1 = 0$) of the aspheric surface 11$a$ and a center position (a position at which a coordinate $r_2 = 0$) is designed as L=25 mm. In FIGS. 21 and 22, further, in order that a difference of elevation of aspheric surface is made clear, a reference of a longitudinal axis (a position at which a height is 0 μm) is made to be different from a center (a position at which a coordinate $r_1=r_2=0$) of the aspheric lenses 11 and 12.

If approximation of a high-order polynomial to the shape of the aspheric surface 11a of the incident aspheric lens 11 shown in FIG. 21 and the shape of the aspheric surface 12a of the emitting aspheric lens 12 shown in FIG. 22 is performed, the high-order polynomial $Z_1(r)$ of the shape (a height of aspheric surface) of the aspheric surface 11a and the high-order polynomial $Z_2(r)$ of the shape (a height of aspheric surface) of the aspheric surface 12a are indicated by Equations 20 and 21, respectively (a unit of a radius r is mm).

$$Z_1(r) = Z_0 + \frac{cr^2}{1+\sqrt{1-(1+K)c^2r^2}} + \alpha_1 r^4 + \alpha_2 r^6 + \alpha_3 r^8 + \alpha_4 r^{10} + \alpha_5 r^{12} + \alpha_6 r^{14} + \alpha_7 r^{16} + \alpha_8 r^{18} + \alpha_9 r^{20} \quad (20)$$

$Z_0 = 0.350060271791103$,
$c = -0.0335120447820325$,
$K = 0$,
$\alpha_1 = -0.0231547991056179$,
$\alpha_2 = 0.00445665882657025$,
$\alpha_3 = -0.000284230904782999$,
$\alpha_4 = -2.59168381632891\ E\text{-}06$,
$\alpha_5 = 0.0000132262398562683$,
$\alpha_6 = 7.5072367714753\ E\text{-}06$,
$\alpha_7 = -1.50639871979035\ E\text{-}08$,
$\alpha_8 = 3.21477233487456\ E\text{-}07$,
$\alpha_9 = -1.4707055813572\ E\text{-}08$ $$Z_2(r) = Z_0 + \frac{cr^2}{1+\sqrt{1-(1+K)c^2r^2}} + \alpha_1 r^4 + \alpha_2 r^6 + \alpha_3 r^8 + \alpha_4 r^{10} + \alpha_5 r^{12} + \alpha_6 r^{14} + \alpha_7 r^{16} + \alpha_8 r^{18} + \alpha_9 r^{20} \quad (21)$$

$Z_0 = 0.12102784735932$,
$c = -0.0612836459255392$,
$K = 0$,
$\alpha_1 = -0.0018762895940451$,
$\alpha_2 = 0.00565750401091439$,
$\alpha_3 = -0.00619122793771896$,
$\alpha_4 = 0.00393535214632535$,
$\alpha_5 = -0.0015200258472543$,
$\alpha_6 = 0.000363537112881753$,
$\alpha_7 = -0.0000525402521473375$,
$\alpha_8 = 5.20752573217144\ E\text{-}06$,
$\alpha_9 = -1.4333703918705\ E\text{-}07$ A pair of aspheric lenses 11 and 12 is manufactured based on these high-order polynomials $Z_1(r)$ and $Z_2(r)$, and properties thereof are estimated. According to the pair of aspheric lenses 11 and 12, it is identified that the intensity distribution of the laser light is preferably shaped in a spatially even intensity distribution.

Embodiment

Figure 23:
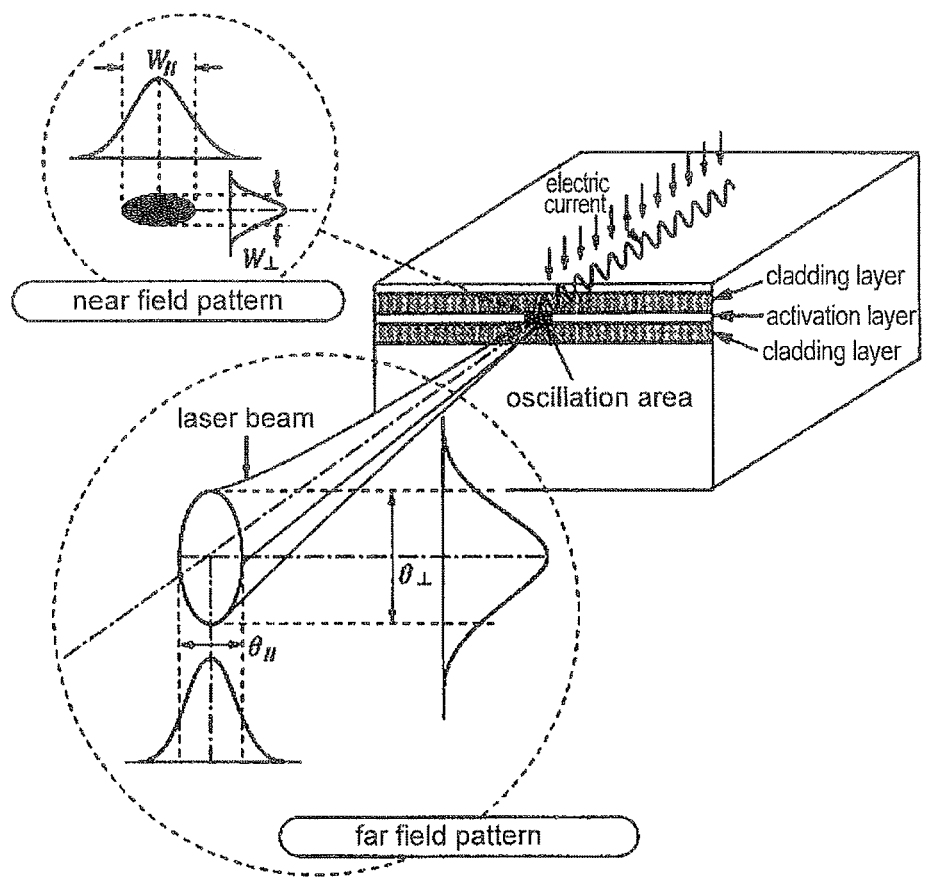
FIG. 23 is a view illustrating an example of a semiconductor laser generating laser light with a different divergence angle.

In the second comparative example, a method of designing and manufacturing a homogenizer which has incident laser light in a concentric shape, and has identical divergence angles in any direction has been illustrated. An aspheric shape for a first direction of a radial direction has been obtained by starting from a peak as a reference point. However, the incident laser light does not have a concentric circle shape, and may have a different divergence angle depending on a rotary angle (a radius direction) of a radius vector. For example, as shown in FIG. 23, since semiconductor lasers have significantly different sizes of a light emitting unit in a vertical direction and a horizontal direction, a divergence angle due to diffraction, a divergence angle in the horizontal direction and a divergence angle in the vertical direction are different (astigmatism). In the embodiment, accordingly, a method of designing a homogenizer for performing homogenization of intensity distribution of non-parallel light (diffusion light) with a different divergence angle is invented.

Figure 24:
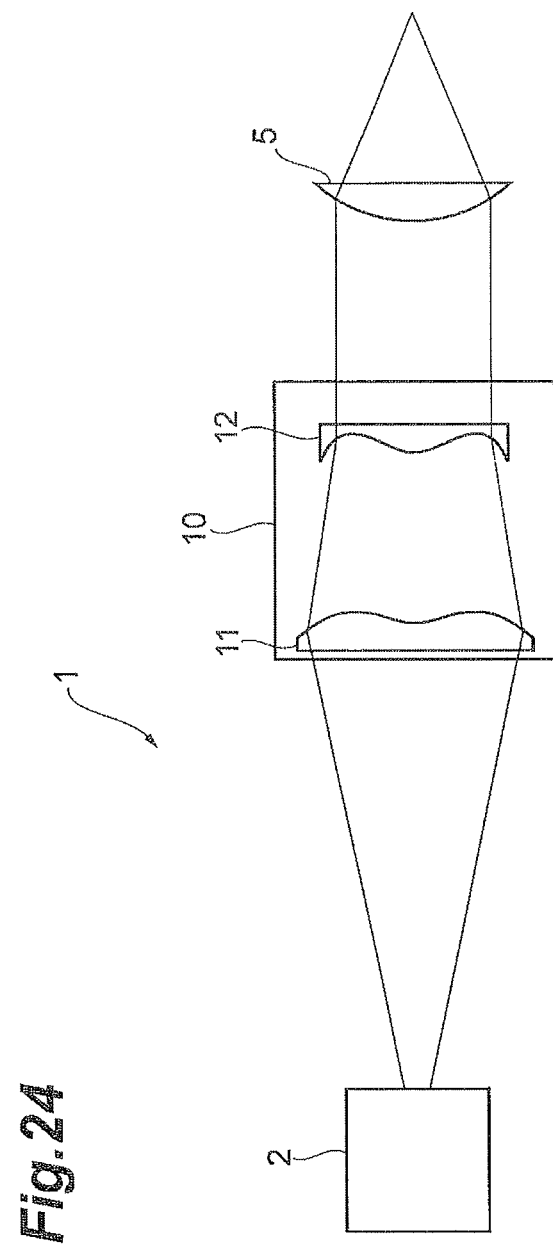
FIG. 24 is a view illustrating a structure of an example of an optical system for shaping laser light with a homogenizer according to an embodiment of the present invention.

FIG. 24 is a view illustrating a structure of an optical system for shaping laser light according to an embodiment of the present invention. The optical system 1 for shaping the laser light includes a laser light source 2, a homogenizer 10 and a condensing lens 5. On the other hand, an optical imaging system may be disposed between the homogenizer 10 and the condensing lens 5. Emitted laser light Oo of the homogenizer 10 has uneven intensity distribution after being shaped when a propagative distance is long. However, if the optical imaging system is used, the emitted laser light Oo with the intensity distribution after being shaped is made to be formed as an image on a pupil surface of the condensing lens 5, and it is possible to maintain a preferable light condensing state. Further, a focusing distance of a lens constituting the optical imaging system is designed to be a desired value, thereby enlarging or reducing a beam diameter.

Figure 25:
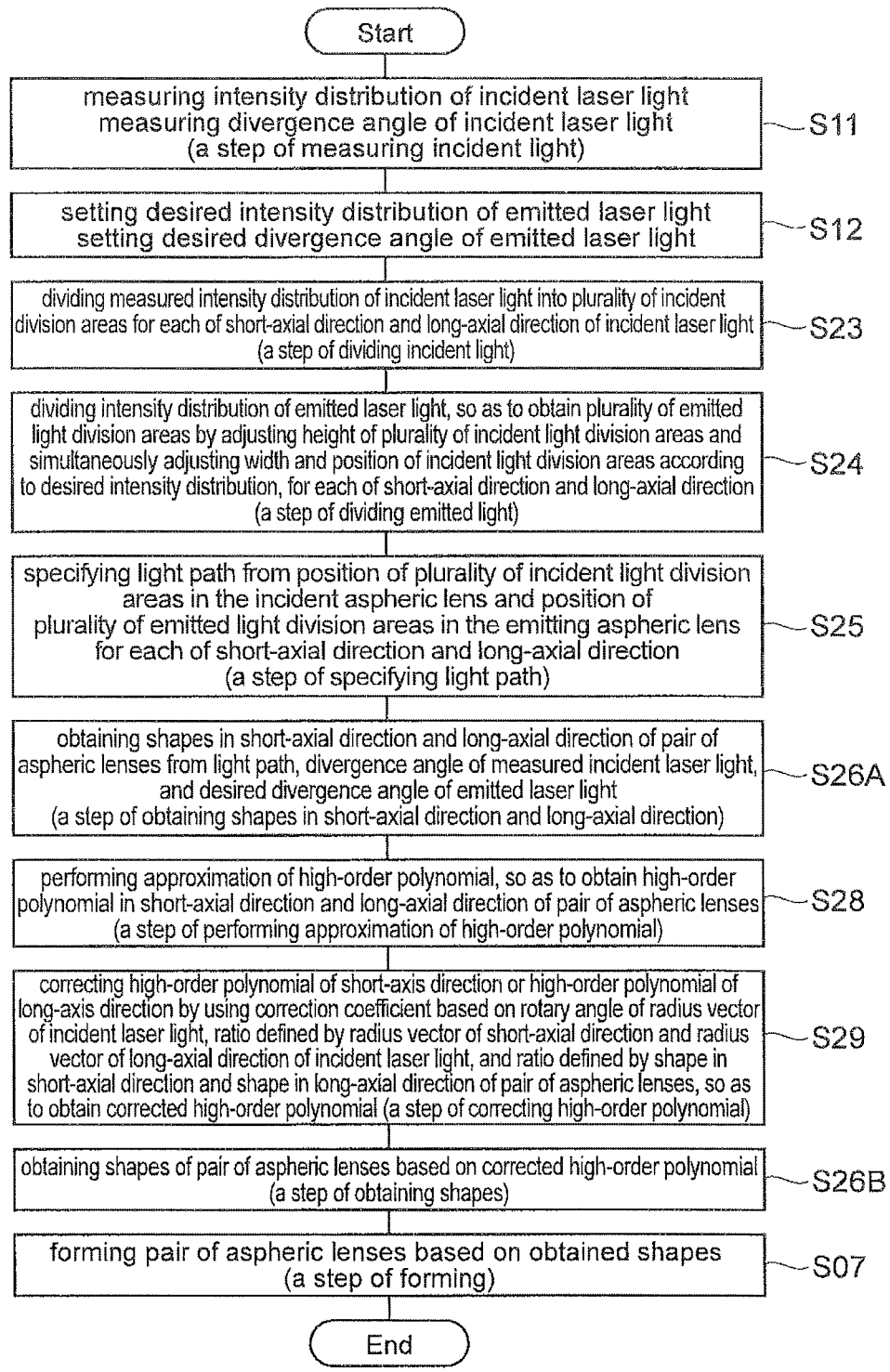
FIG. 25 is a flowchart illustrating a process of designing and manufacturing the homogenizer according to the embodiment of the present invention.

FIG. 25 is a flowchart illustrating a process of designing and manufacturing the homogenizer according to the embodiment of the present invention. The method of designing and manufacturing the homogenizer of the embodiment is different from the second comparative example, in view of performing processes of step S23 (a step of dividing incident light), step S24 (a step of dividing emitted light), step S25 (a step of specifying light path), step S26A (a step of obtaining shapes in short-axial direction and long-axial direction), step S28 (a step of performing approximation of high-order polynomial), step S29 (a step of correcting high-order polynomial) and step S26B a step of obtaining shapes), instead of performing step S03 (a step of dividing incident light), step S04 (a step of dividing emitted light), step S05 (a step of specifying light path) and step S16 (a step of obtaining shapes).

In step S11, as described above, intensity distribution of the incident laser light is measured, and simultaneously a divergence angle of the incident laser light is measured. Further, in step S12, as described above, desired intensity distribution of the emitted laser light is set, and simultaneously a desired divergence angle of the emitted laser light is set.

Figure 26:
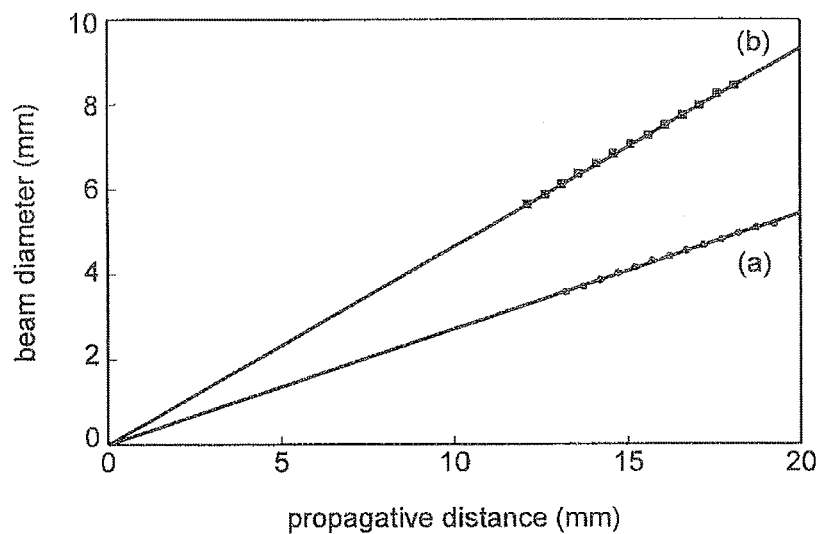
FIG. 26 is a flowchart illustrating a result of measuring a radius of a beam in a short-axial direction and a long-axial direction to a propagated distance of incident laser light with a different divergence angle.

For example, as shown in FIG. 23, incident laser light Oi (non-parallel light, wavelength 658 nm), which has intensity distribution which is the Gaussian distribution, and is diffused as shown in FIG. 26, is regarded as the emitted laser light Oo with a spatially even intensity distribution.

In FIG. 26, a measured value of the beam diameter ($1/e^2$) for a propagative distance from a light emitting point is shown as a point, and a fitting function of the measured value is shown by a line. According to FIGS. 26A and 26B, with a position of the propagative distance of 10 mm, a beam diameter of a short-axial direction (a horizontal direction) and a beam diameter of a long-axial direction (a vertical direction) of the incident laser light Oi are assumed to be 2.733 mm ($1/e^2$) and 4.670 mm ($1/e^2$) respectively. Accordingly, in the incident laser light Oi at a position of the propagative distance of 10 mm, a ratio of the beam diameter in the long-axial direction to the beam diameter in the short-axial direction, i.e., a ratio Rr of a maximum value of a radius vector in a long-axial direction to a maximum value of a radius vector in a short axial direction is 1.71.

In turn, in step S23 (a step of dividing incident light), with the incident aspheric lens 11, for each of the short-axial direction and the long-axial direction of the incident laser light Oi, similarly to the above-mentioned step S03, the intensity distribution of the measured incident laser light Oi is divided by a predetermined distance (width) in a distribution direction, so as to obtain a plurality of incident light division areas A1, A2, A3, A4, A5, A6 and A7.

Continuously, in step S24 (a step of dividing emitted light), with the emitting aspheric lens 12, for each of the short-axial direction and the long-axial direction, similarly to the above-mentioned step S04, the intensity distribution of the emitted laser light Oo is divided at a predetermined distance (width) in a distribution direction, so that a plurality of emitted light division areas B1, B2, B3, B4, B5, B6 and B7 are obtained by adjusting the intensities (height) of each of the plurality of incident light division areas A1, A2, A3, A4, A5, A6 and A7 and simultaneously by adjusting the width and the position of the distribution direction of each of the plurality of incident light division areas A1, A2, A3, A4, A5, A6 or A7 according to the desired intensity distribution.

Next, in step S25 (a step of specifying light path), for the short-axial direction and the long-axial direction, similarly to the above-mentioned step S05, the light paths P1, P2, P3, P4, P5, P6, P7 and P8 are specified from positions in distribution directions of the incident light division areas A1, A2, A3, A4, A5, A6 and A7 in the incident aspheric lens 11 and positions in distribution directions of the corresponding emitted light division areas B1, B2, B3, B4, B5, B6 and B7 in the emitting aspheric lens 12.

Then, in step S26A (a step of obtaining shapes in short-axial direction and long-axial direction), similarly to the above-mentioned step S16, the aspheric shapes in short-axial direction and long-axial direction of a pair of the aspheric lenses 11 and 12 are obtained based on a divergence angle of the measured incident laser light Oi and a desired divergence angle of emitted laser light, in addition to the obtained light paths P1, P2, P3, P4, P5, P6, P7 and P8.

For example, in the case that aspheric surface 11a of the incident aspheric lens 11 is disposed at a position spaced by a propagative distance of 10 mm from a light emitting point, as shown in FIG. 27A, the shape in short-axial direction of the aspheric surface 11a of the incident aspheric lens 11 is obtained, and as shown in FIG. 27B, the shape in long-axial direction of the aspheric surface 11a of the incident aspheric lens 11 is obtained. Further, as shown in FIG. 28A, the shape in short-axial direction of the aspheric surface 12a of the emitting aspheric lens 12 is obtained, and as shown in FIG. 28B, the shape in long-axial direction of the aspheric surface 12a of the emitting aspheric lens 12 is obtained.

Figure 27:
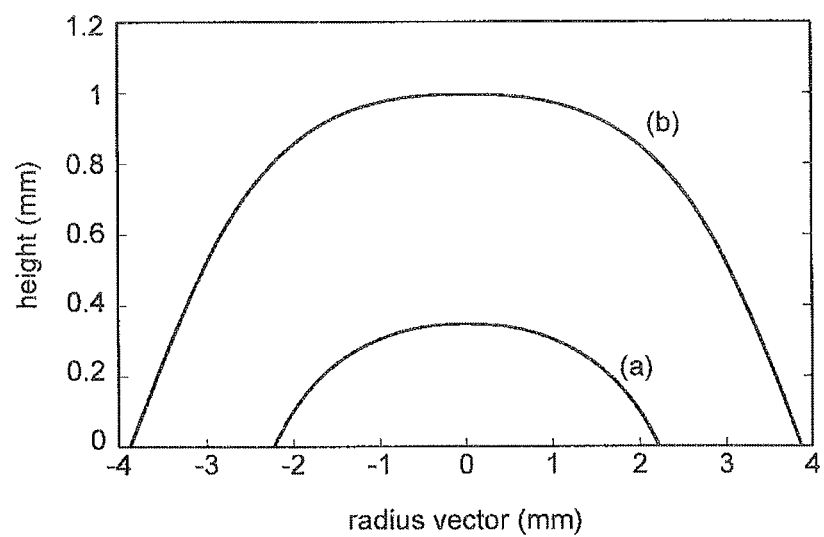
FIG. 27 is a view illustrating an example of a shape in a short-axial direction and a long-axial direction of an incident aspheric lens, obtained in a step of obtaining shapes in short-axial direction and long-axial direction.
Figure 28:
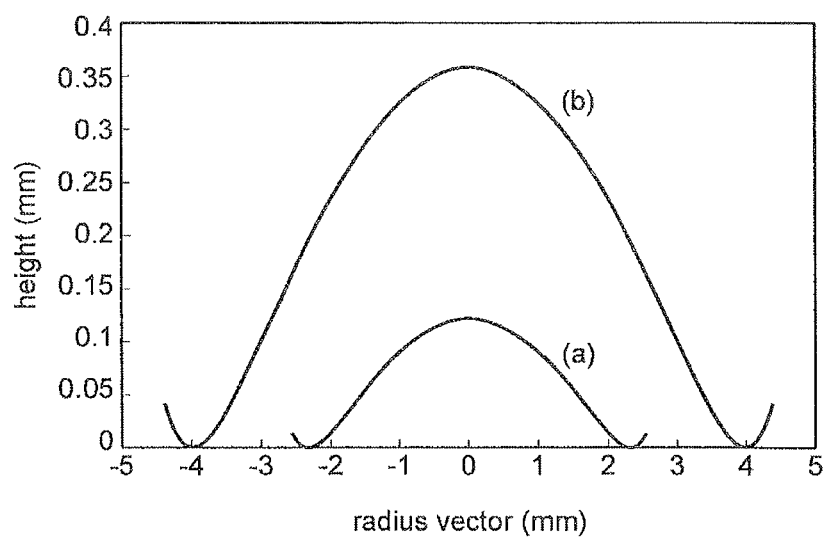
FIG. 28 is a view illustrating an example of a shape in a short-axial direction and a long-axial direction of an emitting aspheric lens, obtained in a step of obtaining shapes in short-axial direction and long-axial direction.

On the other hand, FIGS. 27 and 28 show an example in which $MgF_2$ (n=1.377) is used as a material of the aspheric lenses 11 and 12, and a distance between a center position (a position at which a coordinate $r_1$=0) of the aspheric surface 11a and a center position (a position at which a coordinate $r_2$=0) is designed as L=25 mm. In FIGS. 27 and 28, further, in order that a difference of elevation of aspheric surface is made clear, a reference of a longitudinal axis (a position at which a height is 0 μm) is made to be different from a center (a position at which a coordinate $r_1$=$r_2$=0) of the aspheric lenses 11 and 12.

Then, in step S28 (a step of performing approximation of high-order polynomial), similarly to the above-mentioned step S16, approximation of the high-order polynomial is performed with respect to the shape in short-axial direction of the aspheric surface 11a of the incident aspheric lens 11 shown in FIG. 27A, and approximation of the high-order polynomial is performed with respect to the shape in the short-axial direction of the aspheric surface 12a of the emitting aspheric lens 12 shown in FIG. 28A, so that the high-order polynomial $Z_{1a}(r)$ of the shape (a height of the aspheric surface) in the short-axial direction of the aspheric surface 11a and the high-order polynomial $Z_{2a}(r)$ of the shape (a height of the aspheric surface) in the short-axial direction are obtained by Equations 22 and 23, respectively (a unit of a radius vector r is mm).

$$Z_{1a}(r) = Z_0 + \frac{cr^2}{1 + \sqrt{1-(1+K)c^2r^2}} + \alpha_1 r^4 + \alpha_2 r^6 + \alpha_3 r^8 + \alpha_4 r^{10} + \alpha_5 r^{12} + \alpha_6 r^{14} + \alpha_7 r^{16} + \alpha_8 r^{18} + \alpha_9 r^{20} \quad (22)$$

$Z_0 = 0.350060271791103$,
$c = -0.0335120447280325$,
$K = 0$,
$\alpha_1 = -0.0231547991053179$,
$\alpha_2 = 0.00445665882657025$,
$\alpha_3 = -0.000284230904782999$,
$\alpha_4 = -2.59168381632891\ E\text{-}06$,
$\alpha_5 = 0.0000132262398562683$,
$\alpha_6 = 7.50723677147593\ E\text{-}06$,
$\alpha_7 = -1.50639871979035\ E\text{-}08$,
$\alpha_8 = 3.21477233487456\ E\text{-}07$,
$\alpha_9 = -1.47307055813572\ E\text{-}08$ $$Z_{2a}(r) = Z_0 + \frac{cr^2}{1 + \sqrt{1-(1+K)c^2r^2}} + \alpha_1 r^4 + \alpha_2 r^6 + \alpha_3 r^8 + \alpha_4 r^{10} + \alpha_5 r^{12} + \alpha_6 r^{14} + \alpha_7 r^{16} + \alpha_8 r^{18} + \alpha_9 r^{20} \quad (23)$$

$Z_0 = 0.12102784735932$,
$c = -0.0612836459255392$,
$K = 0$,
$-0.0018762895940451$,
$\alpha_2 = 0.00565750401091439$,
$\alpha_3 = -0.00619122793771896$,
$\alpha_4 = 0.00393535214632535$,
$\alpha_5 = -0.0015200258472543$,
$\alpha_6 = 0.000363537112881753$,
$\alpha_7 = -0.0000525402521473375$,
$\alpha_8 = 4.20752573217144\ E\text{-}06$,
$\alpha_9 = -1.43337039188705\ E\text{-}07$ Similarly, approximation of a the high-order polynomial to the shape of the aspheric surface 11a of the incident aspheric lens 11 shown in FIG. 27 and the shape of the aspheric surface 12a of the emitting aspheric lens 12 shown in FIG. 28 is performed, so that the high-order polynomial $Z_{1b}(r)$ of the shape (a height of aspheric surface) in the long-axial direction of the aspheric surface 11a and the high-order polynomial $Z_{2b}(r)$ of the shape (a height of aspheric surface) in the long-axial direction of the aspheric surface 12a are obtained by Equations 24 and 25, respectively (a unit of a radius r is mm).

$$Z_{1b}(r) = Z_0 + \frac{cr^2}{1 + \sqrt{1-(1+K)c^2r^2}} + \alpha_1 r^4 + \alpha_2 r^6 + \alpha_3 r^8 + \alpha_4 r^{10} + \alpha_5 r^{12} + \alpha_6 r^{14} + \alpha_7 r^{16} + \alpha_8 r^{18} + \alpha_9 r^{20} \quad (24)$$

$Z_0 = 0.999744765422979$,
$c = -0.025501288167687$,
$K = 0$,
$\alpha_1 = -0.00779439758374836$,
$\alpha_2 = 0.000514205035516824$,
$\alpha_3 = -0.0000178494594498606$,
$\alpha_4 = 1.51670534278056\ E\text{-}07$,
$\alpha_5 = -1.3710575306782\ E\text{-}07$,
$\alpha_6 = 2.7221471663064\ E\text{-}08$,
$\alpha_7 = -2.1347767748253\ E\text{-}09$,
$\alpha_8 = 7.93767668581535\ E\text{-}11$,
$\alpha_9 = -1.16817554775238\ E\text{-}12$ -continued $$Z_{2b}(r) = Z_0 + \frac{cr^2}{1 + \sqrt{1 - (1+K)c^2 r^2}} + \alpha_1 r^4 + \alpha_2 r^6 + \alpha_3 r^8 + \alpha_4 r^{10} + \alpha_5 r^{12}2 + \alpha_6 r^{14} + \alpha_7 r^{16} + \alpha_8 r^{18} + \alpha_9 r^{20} \quad (25)$$

$Z_0 = 0.358429163892539$,
$c = -0.061266244924921$,
$K = 0$,
$\alpha_1 = -0.000592140229237842$,
$\alpha_2 = 0.000630170183409268$,
$\alpha_3 = -0.000230974778737322$,
$\alpha_4 = 0.0000491620526766769$,
$\alpha_5 = -6.35843489783214\ E\text{-}06$,
$\alpha_6 = 5.09206932756945\ E\text{-}07$,
$\alpha_7 = -2.46417253532681\ E\text{-}08$,
$\alpha_8 = 6.60755442416571\ E\text{-}10$,
$\alpha_9 = -7.53702687864744\ E\text{-}12$ In Equations 22 and 24, a ratio $R_{z1}$ of a maximum value of the shape (a height of aspheric surface) in the long-axial direction to a maximum value of the shape (a height of aspheric surface) in the short-axial direction of the aspheric surface 11a of the incident aspheric lens 11 is 2.835. In Equations 23 and 25, a ratio $R_{z2}$ of a maximum value of the shape (a height of aspheric surface) in the long-axial direction to a maximum value of the shape (a height of aspheric surface) in the short-axial direction of the aspheric surface 12a of the incident aspheric lens 12 is 2.9615 times.

Figure 29:
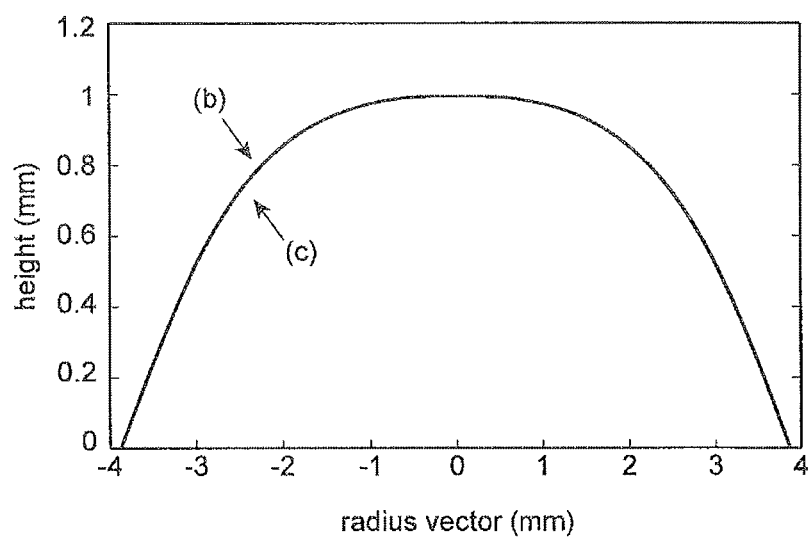
FIG. 29 is a view illustrating a shape in a short-axial direction of an incident aspheric lens in FIG. 27, which is multiplied by a predetermined proportion.
Figure 30:
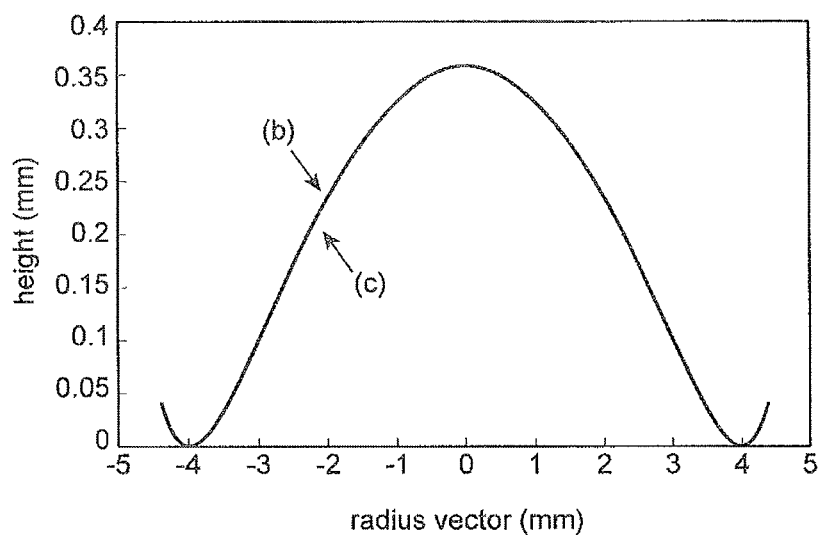
FIG. 30 is a view illustrating a shape in a short-axial direction of an emitting aspheric lens in FIG. 28, which is multiplied by a predetermined proportion.

Here, in FIG. 27, when the shape (a) in the short-axial direction of the incident aspheric lens 11 is multiplied by R=1.71 in a direction of the radius vector, and by $R_{z1}$=2.835 in a direction of a height, it may be identified that the shape (a) becomes a shape (c) of FIG. 29, and is nearly identical to a shape (b) of a long-axial direction in FIG. 27. In FIG. 28, further, when the shape (a) in the short-axial direction of the incident aspheric lens 12 is multiplied by $R_r$=1.71 times in a direction of the radius vector, and by $R_{z2}$=2.9615 times in a direction of a height, it may be identified that the shape (a) becomes a shape (c) of FIG. 30, and is nearly identical to a shape (b) of a long-axial direction in FIG. 28.

Thus, with the high-order polynomial $Z_{1a}(r)$ of the shape in the short-axial direction of the incident aspheric lens 11 indicated by Equation (22), when the radius r is multiplied by 1/Rr times, and all terms of the high-order polynomial $Z_{1a}(r)$ are multiplied by $R_{z1}$ times, the high-order polynomial $Z_{1a}(r)$ is practically identical to the high-order polynomial. $Z_{1b}(r)$ of the shape in the long-axial direction indicated by Equation (24). Further, with the high-order polynomial $Z_{2a}(r)$ of the shape in the short-axial direction of the emitted aspheric lens 12 indicated by Equation (23), when the radius r is multiplied by 1/Rr times, and all terms of the high-order polynomial $Z_{2a}(r)$ are multiplied by $R_{z2}$ times, the high-order polynomial $Z_{2a}(r)$ is practically identical to the high-order polynomial $Z_{2b}(r)$ of the long-axial direction indicated by Equation (25).

Next, the shapes of the short-axis and the long-axis is complemented. Particularly, in step S29 (a step of correcting high-order polynomial), the high-order polynomial of the short-axis direction is corrected, thereby obtaining the corrected high-order polynomial. A correction coefficient may be obtained from an ellipse function.

Figure 31:
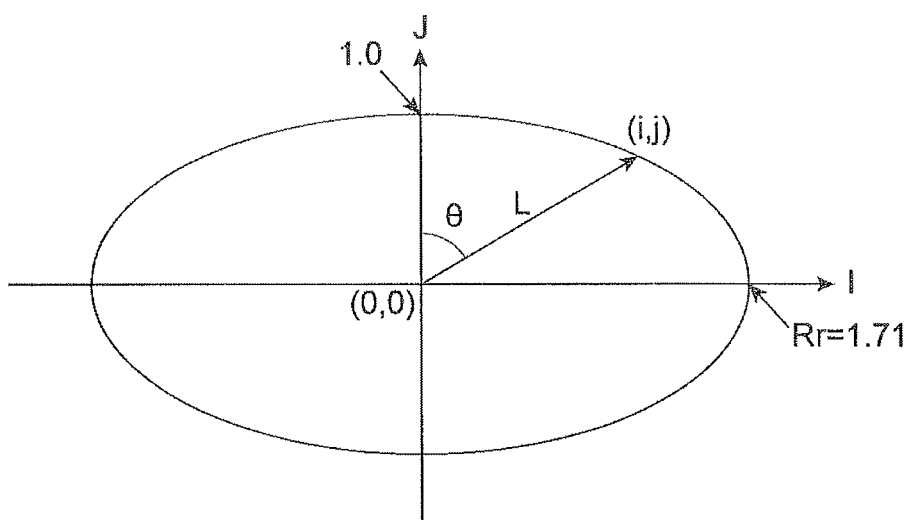
FIG. 31 is a view illustrating an ellipse in an orthogonal coordinate system including a short axis J and a long axis I.

First, a correction coefficient A for a radius vector r from a center is obtained. As shown in FIG. 31, with an ellipse on an orthogonal coordinate defined by a short-axis J and a long-axis I, if a ratio of a maximum value of a radius vector in a long-axial direction to a maximum value of a radius vector in a short-axial direction is defined as $R_r$=1.71, Equation (26) is established at a predetermined position (i, j).

$$\frac{i^2}{Rr^2} + j^2 = 1 \quad (26)$$

Further, if a rotary angle to an axis J of a radius vector which connects the predetermined position (i, j) with a rotary center (0, 0) is set to θ, Equation (27) is established.

$$\tan\theta = \frac{i}{j} \quad (27)$$

Equation (28) is obtained through Equations (26) and (27).

$$i = \tan\theta \bigg/ \sqrt{1 + \frac{\tan^2\theta}{Rr^2}} \quad (28)$$

Since the correction coefficient A corresponds to a length L of the radius vector, the correction coefficient A for the radius vector r is obtained by Equation (29).

$$A = \sqrt{i^2 + j^2} = \sqrt{\frac{1 + \tan^2\theta}{1 + \frac{\tan^2\theta}{Rr^2}}} \quad (29)$$

Next, a correction coefficient B for an aspheric shape (an aspheric height) of the incident aspheric lens 11 is obtained. Similarly, as shown in FIG. 31, with an ellipse on an orthogonal coordinate defined by a short-axis J and a long-axis I, when a ratio of a maximum value of a radius vector in a long-axial direction to a maximum value of a radius vector in a short-axial direction is defined as $R_{z1}$=2.835, and a rotary angle to an axis J of a radius vector which connects a predetermined position (i, j) with a rotary center (0, 0) is set to θ, the correction coefficient B for the aspheric shape (a height of aspheric surface) is obtained by Equation (30).

$$B = \sqrt{\frac{1 + \tan^2\theta}{1 + \frac{\tan^2\theta}{R_{z1}^2}}} \quad (30)$$

Thus, in the high-order polynomial $Z_{1a}(r)$ for the shape in the short-axial direction of the incident aspheric lens 11 indicated by Equation (22), if the radius vector r is multiplied by 1/A times, and all terms of the high-order polynomial $Z_{1a}(r)$ are multiplied B times, the aspheric shape (a height of aspheric surface) $Z_1(r)$ at a predetermined position (i, j) of the incident aspheric lens 11 is obtained by Equation (31) below. That is, the high-order polynomial $Z_{1a}(r)$ indicating a shape of a short-axial direction of the incident aspheric lens 11 is corrected by using the correction coefficients A and B which are based on the rotary angle θ of the radius vector of the incident laser light, a ratio R, of the radius vector of the long-axial direction to the radius vector of the short-axial direction of the incident laser, and a ratio $R_{z1}$ of the shape of the long-axial direction to the shape of the short-axial direction of the incident aspheric lens, so as to obtain the corrected high-order polynomial $Z_1(r)$.

$$Z_1(r) = \quad (31)$$

$$B\left\{Z_0 + \frac{c\frac{r^2}{A}}{1+\sqrt{1-(1+K)c^2\frac{r^2}{A}}} + \alpha_1\frac{r^4}{A} + \alpha_2\frac{r^6}{A} + \alpha_3\frac{r^8}{A} + \alpha_4\frac{r^{10}}{A} + \right.$$

$$\left. \alpha_5\frac{r^{12}}{A} + \alpha_6\frac{r^{14}}{A} + \alpha_7\frac{r^{16}}{A} + \alpha_8\frac{r^{18}}{A} + \alpha_9\frac{r^{20}}{A}\right\}$$

Similarly, the correction coefficient A for the radius vector r of the emitting aspheric lens 12 and the correction coefficient B for the aspheric shape (a height of aspheric surface) are obtained by Equations (32) and (33) in which $$R_r = 1.71 \text{ and } R_{z2} = 2.9615. \quad (32)$$

$$A = \sqrt{\frac{1+\tan^2\theta}{1+\frac{\tan^2\theta}{Rr^2}}}$$

$$B = \sqrt{\frac{1+\tan^2\theta}{1+\frac{\tan^2\theta}{R_{z2}^2}}} \quad (33)$$

Thus, in the high-order polynomial $Z_{2a}(r)$ for the shape of the short-axial direction of the emitting aspheric lens 12 indicated by Equation (23), if the radius vector r is multiplied by 1/A times, and all terms of the high-order polynomial $Z_{2a}(r)$ are multiplied B times, the aspheric shape (a height of aspheric surface) $Z_2(r)$ at a predetermined position (i, j) of the emitting aspheric lens 12 is obtained by Equation (34) below. That is, the high-order polynomial $Z_{2a}(r)$ indicating a shape of a short-axial direction of the incident aspheric lens 12 is corrected by using the correction coefficients A and B which are based on the rotary angle θ of the radius vector of the incident laser light, a ratio Rr of the radius vector of the long-axial direction to the radius vector of the short-axial direction of the incident laser light, and a ratio $R_{z2}$ of the shape of the long-axial direction to the shape of the short-axial direction of the incident aspheric lens, so as to obtain the corrected high-order polynomial $Z_2(r)$.

$$Z_2(r) = \quad (34)$$

$$B\left\{Z_0 + \frac{c\frac{r^2}{A}}{1+\sqrt{1-(1+K)c^2\frac{r^2}{A}}} + \alpha_1\frac{r^4}{A} + \alpha_2\frac{r^6}{A} + \alpha_4\frac{r^{10}}{A} + \alpha_5\frac{r^{12}}{A} + \right.$$

$$\left. \alpha_6\frac{r^{14}}{A} + \alpha_7\frac{r^{16}}{A} + \alpha_8\frac{r^{18}}{A} + \alpha_9\frac{r^{20}}{A}\right\}$$

Figure 32:
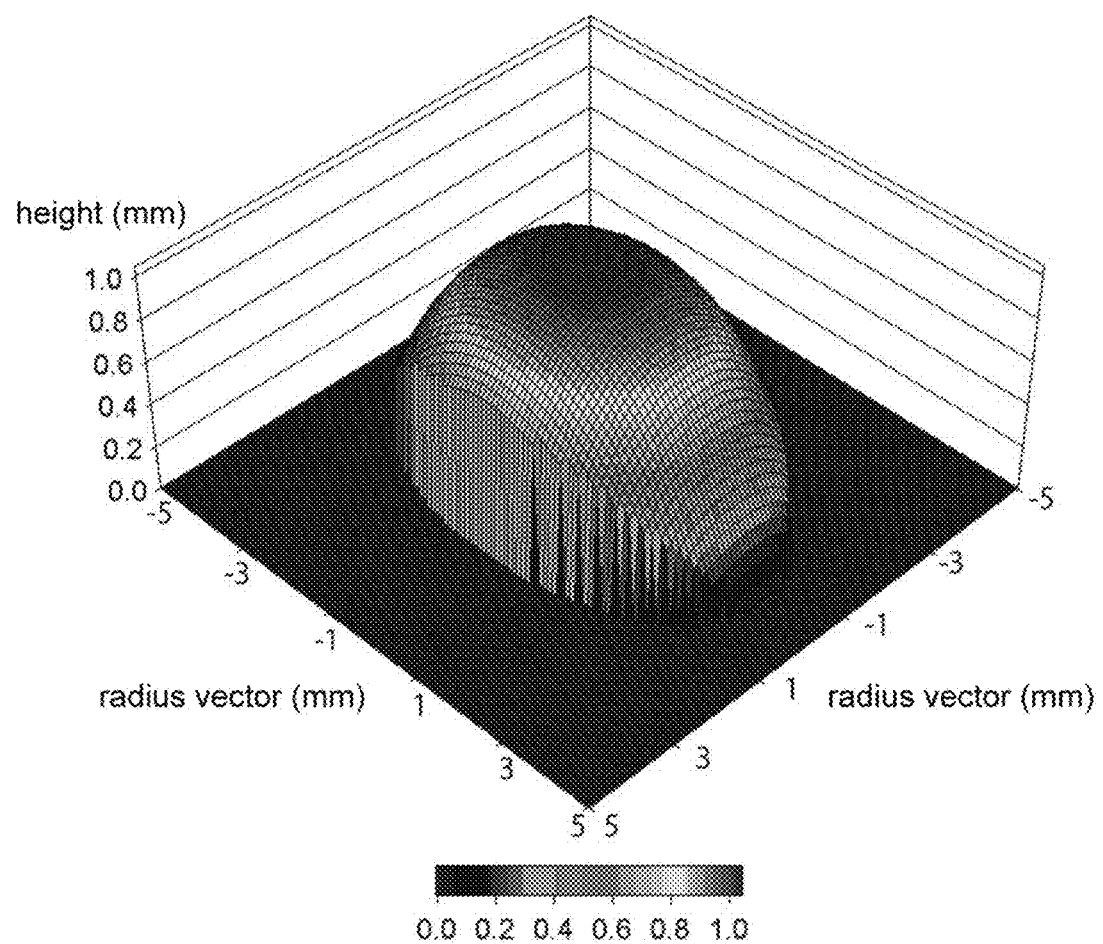
FIG. 32 is a view illustrating an example of a shape of an incident aspheric lens, obtained by a method of designing and manufacturing the homogenizer of the present invention.
Figure 33:
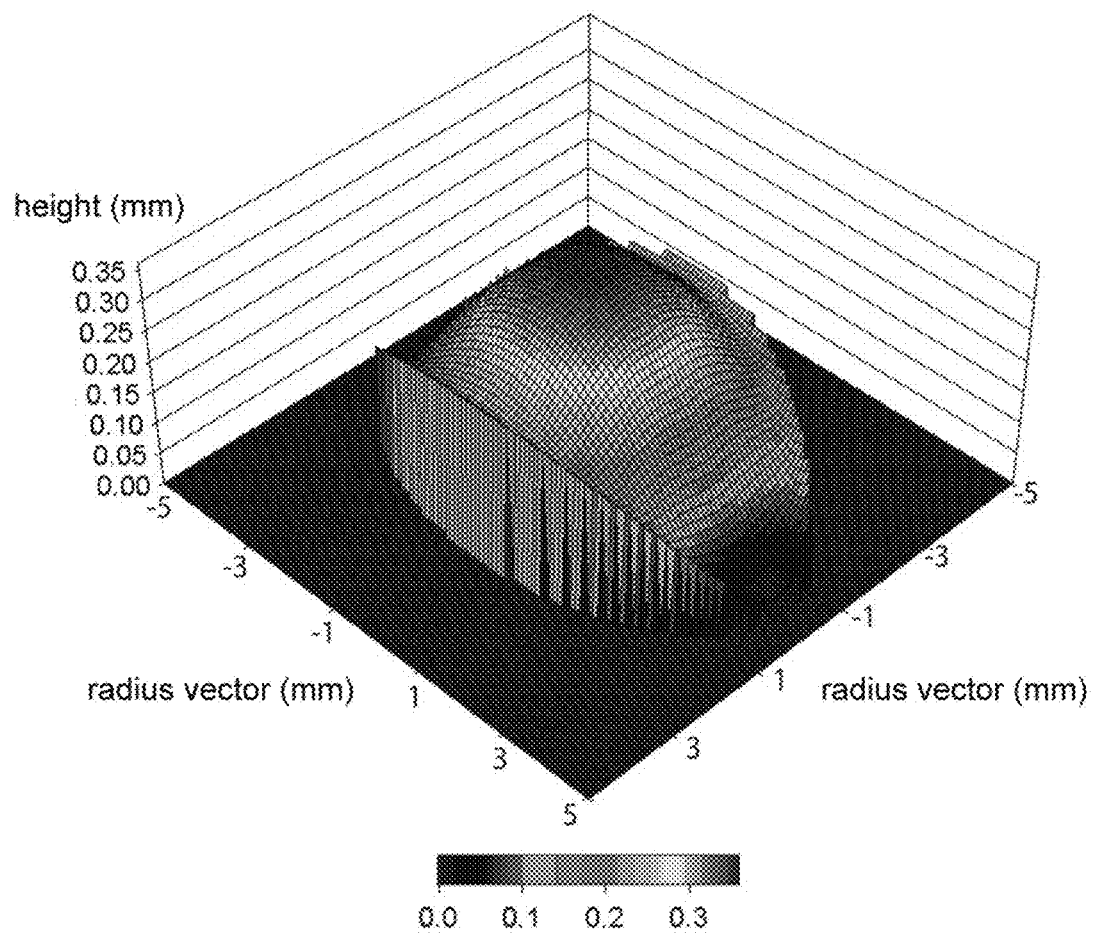
FIG. 33 is a view illustrating an example of a shape of an emitting aspheric lens, obtained by a method of designing and manufacturing the homogenizer of the present invention.

Next, in step S26B (a step of obtaining shapes), an aspheric shape of the incident aspheric lens 11 is obtained based on a correction high-order polynomial $Z_1(r)$ of the aspheric shape of the incident aspheric lens 11 indicated by Equation 31, and simultaneously an aspheric shape of the emitting aspheric lens 12 is obtained based on the corrected high-order polynomial $Z_2(r)$ of the aspheric shape of the emitting aspheric lens 12 indicated by Equation 34. Accordingly, the aspheric shape of the incident aspheric lens 11 is obtained shown in FIG. 32, and the aspheric shape of the emitting aspheric lens 12 is obtained shown in FIG. 33.

As described above, according to the method of designing and manufacturing the optical component for shaping the laser light of the embodiment, similarly to the above-mentioned first and second comparative examples, the intensity distribution of the incident laser light Oi is measured, and the shapes of the pair of the aspheric lenses 11 and 12 is designed based on the measured intensity distribution. Further, the plurality of the incident light division areas A1, A2, A3, A4, A5, A6 and A7 into which the measured intensity distribution of the incident laser light Oi is divided is obtained, and a plurality of emitted light division areas B1, B2, B3, B4, B5, B6 and B7 in which the intensity (height) of each of the plurality of incident light division areas A1, A2, A3, A4, A5, A6, or A7 is adjusted while the width and the position thereof is adjusted according to a desired intensity distribution of the emitted laser light are obtained, and the light paths P1, P2, P3, P4, P5, P6, P7 and P8 are specified from positions of the plurality of the incident light division areas A1, A2, A3, A4, A5, A6 and A7 in the incident aspheric lens 11, and corresponding positions of the plurality of the emitted light division areas B1, B2, B3, B4, B5, B6 and B7 in the emitting aspheric lens 12. Then, the shapes of the pair of the aspheric lenses 11 and 12 is designed based on these paths P1, P2, P3, P4, P5, P6, P7 and P8. Accordingly, it is possible to obtain the optical component for shaping the laser light, which is capable of shaping the intensity distribution of the laser light into the predetermined intensity distribution at a higher precision.

Further, according to the method of designing and manufacturing the optical component for shaping the laser light of the embodiment, a two dimensional shape of the short-axial and long-axial directions of each of the pair of the aspheric lenses 11 and 12 is obtained for each of the short-axial direction and the long-axial direction of the incident laser light Oo as described above, the approximation of the high-order polynomial of the shapes of the short-axial direction and the long-axial direction of the pair of the aspheric lenses 11 and 12 is performed, and the high-order polynomial of the short-axial direction or the high-order polynomial of the long-axial direction are corrected by using the correction coefficients A and B based on the rotary angle of the radius vector of the incident laser light, the ratio of the radius vector in the long-axis direction to the radius vector in the short-axis direction of the incident laser light, and a ratio of the shape in the long-axis direction to the shape in the short-axis direction of each aspheric lens. Then, a three dimensional shape of the pair of the aspheric lenses 11 and 12 is designed based on the corrected high-order polynomial. Accordingly, it is possible to obtain the optical component for shaping the laser light, which is capable of shaping the intensity distribution of the laser light into the predetermined intensity distribution at a higher precision.

Further, the present invention is not limited to the above-mentioned embodiment, and may be variously modified. In the embodiment, although the process of correcting the high-order polynomial in which the correction coefficient for the high-order polynomial of the short-axial direction is obtained so as to correct the high-order polynomial of the short-axial direction is exemplarily illustrated, it is possible to obtain the correction coefficient for the high-order polynomial of the long-axial direction so as to correct the high-order polynomial of the long-axial direction in the process of correcting the high-order polynomial.

Figure 34:
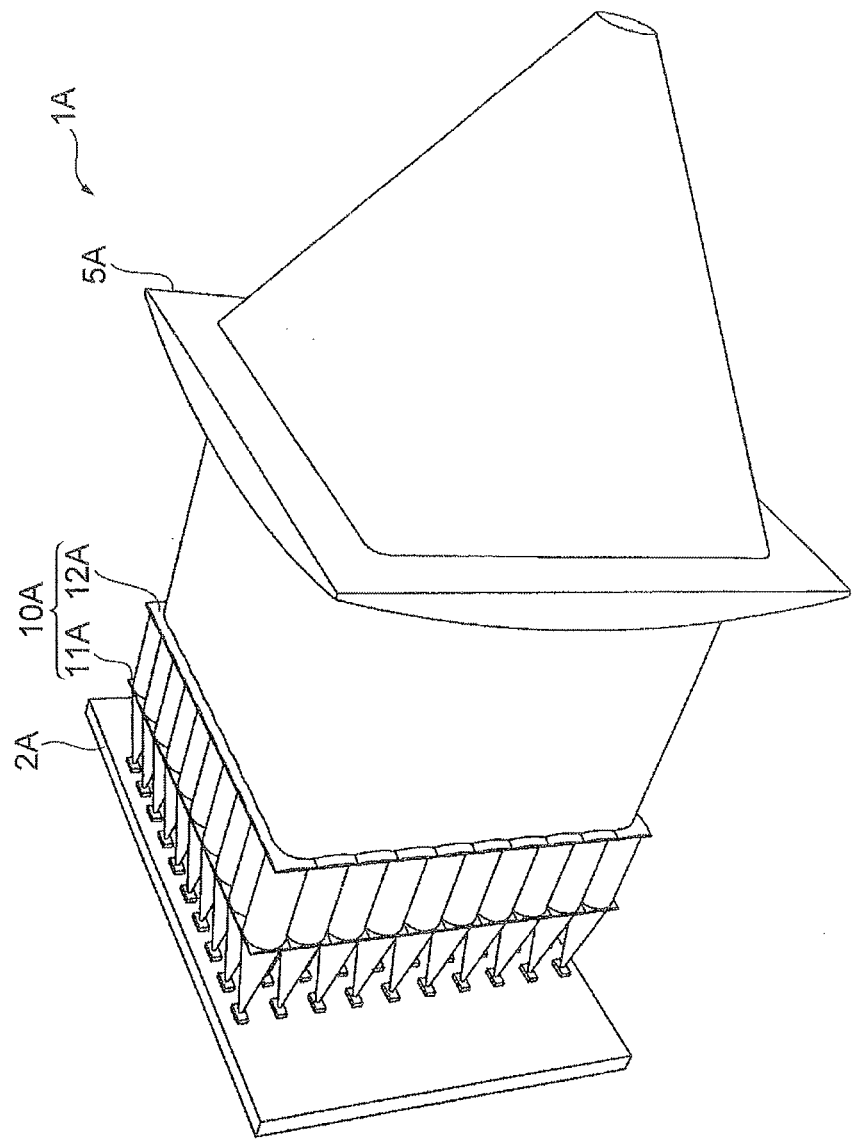
FIG. 34 is a view illustrating a structure of a modification of an optical system for shaping laser light with a homogenizer according to an embodiment of the present invention.
Figure 35:
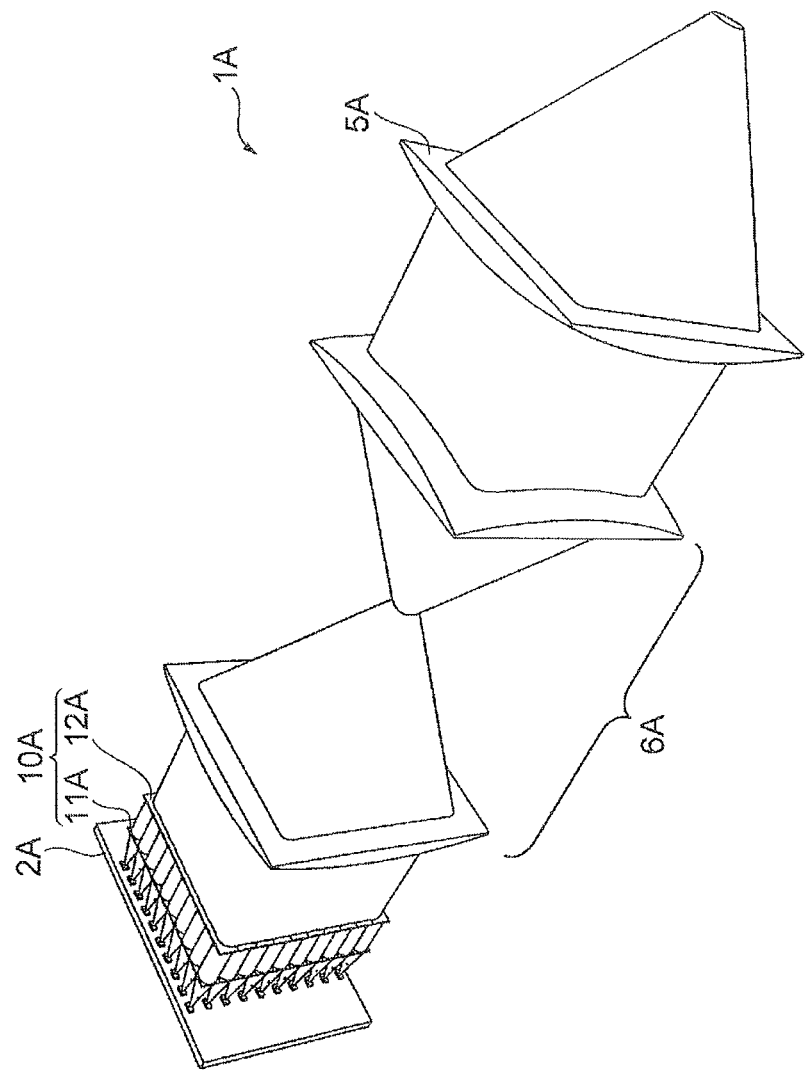
FIG. 35 is a view illustrating a structure of a modification of an optical system for shaping laser light with a homogenizer according to an embodiment of the present invention.
Figure 36:
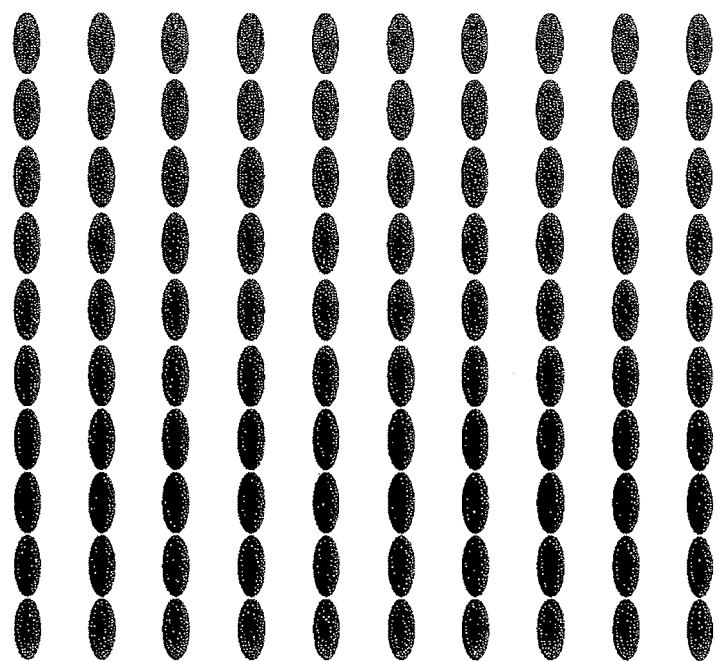
FIG. 36 is a view illustrating a set of emitted laser light on a homogenizer array when an array of a light source with a spatially single mode is used, in an optical system for shaping laser light shown in FIG. 34.

Further, although the method of designing and manufacturing the optical component for shaping the laser light in the optical system 1 for shaping the laser light which includes the single light source 2 and the pair of the homogenizers 10 is exemplarily illustrated, the present invention may be applied to a method of designing and manufacturing the optical component for shaping the laser light in the optical system for shaping the laser light which includes a plurality of light sources such as a semiconductor laser array, and plural pairs of homogenizers. For example, as shown in FIG. 34, in the case that the optical system 1A for shaping laser light, which includes a light source array 2A of 10×10 which are two dimensionally arranged, a homogenizer array 10A of 10×10 which are two dimensionally arranged, and a condensing lens 5A, the method of designing the above-mentioned aspheric shape may be applied to each light source and each homogenizer. On the other hand, as shown in FIG. 35, an optical imaging system 6A may be disposed between the homogenizer array 10A and the condensing lens 5.

Further, in the embodiment, although the method of designing the optical component for shaping the laser light for the light source with a spatially single mode is exemplarily illustrated, the optical component for shaping the laser light designed by the method of designing the optical component of the embodiment is effective in the case of applying the optical component to a diffusion light with a spatial multi-mode. For example, in the optical system 1A for shaping the laser light indicated in FIG. 34, if a light source array 2A with a spatially single mode is used, a set of the emitted laser lights Oo with an even intensity distribution in the form of ellipse is obtained. When the set of the emitted laser lights Oo is condensed by the condensing lens 5A, a condensing point of each light source is distributed in two dimensions on a focusing surface.

Figure 37:
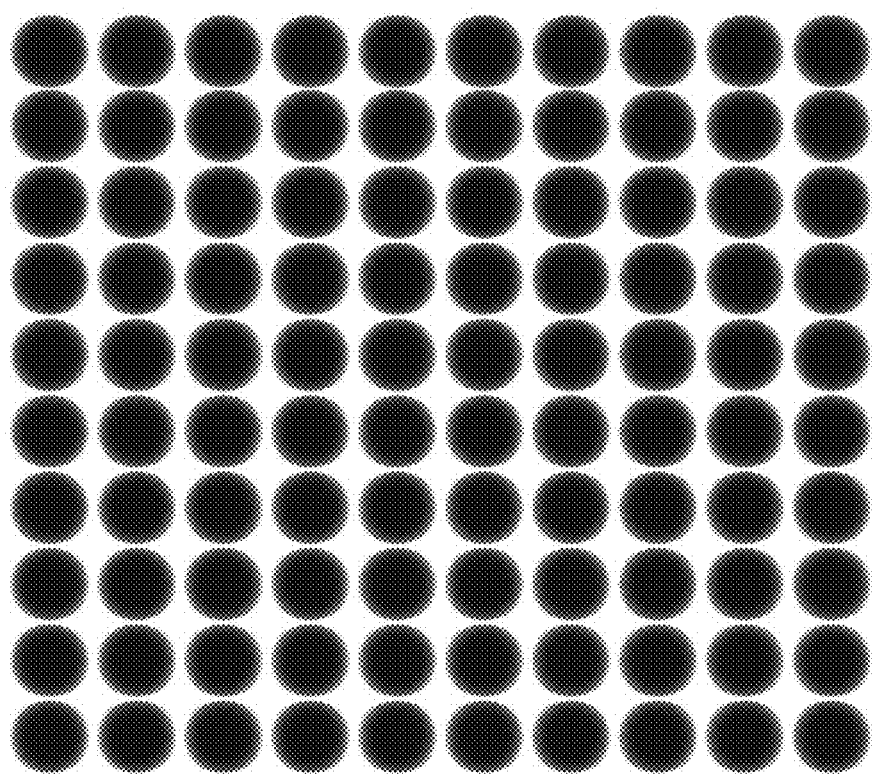
FIG. 37 is a view illustrating a set of emitted laser light on a homogenizer array when an array of a light source with a spatially single mode is used, in an optical system for shaping laser light shown in FIG. 34.

On the other hand, with the diffused light having the spatial multi-mode, since the light emitting unit has a significantly different size in the vertical direction and the horizontal direction, the light emitting unit is regarded as a point light source in the vertical direction (a direction in which a divergence angle is large), but the light emitting unit needs to be treated as a surface light source in the horizontal direction (a direction in which a divergence angle is small). Accordingly, in the optical system 1A for shaping the laser light shown in FIG. 34, if a diffusion light source array 2A with the spatial multi-mode is applied to the homogenizer designed by the designing method of the embodiment, a desired intensity distribution and collimation for a vertical element are implemented, but sufficient uniformity and collimation for the horizontal direction are not implemented. Therefore, as shown in FIG. 37, the set of the emitted laser lights Oo with an uneven intensity distribution in the form of an ellipse may be obtained. Furthermore, the emitted laser light Oo is diffused and propagated in a horizontal direction. For this reason, if the set of the emitted laser lights Oo is condensed by the condensing lens 5A, a focusing surface is formed and approximated to the even intensity distribution with a rectangular shape.

INDUSTRIAL APPLICABILITY

It is possible to acquire an optical component for shaping laser light, which includes a pair of aspheric lenses and is capable of shaping intensity distribution of laser light into a predetermined intensity distribution at a higher precision.

REFERENCE SIGN LIST 1, 1A, 1X: optical system for shaping laser light
2: laser light source
2A: laser light source array
3: spatial filter
4: collimate lens
5, 5A: condensing lens
6A: optical imaging system
10: homogenizer (optical component for shaping laser light)
10A: homogenizer array
11: incident aspheric lens in pair of aspheric lenses
11a: aspheric surface
11b: plane surface
12: emitting aspheric lens in pair of aspheric lenses
12a: aspheric surface
12b: plane surface
A1-A7: incident light division area
B1-B7: emitted light division area
Oi: incident laser light
Oo: emitted laser light
P1-P8: light path
X: optical axis

The invention claimed is:

1. A method of designing an optical component for shaping laser light, which includes a pair of aspheric lenses and shapes an intensity distribution of incident laser light with different divergence angles into a desired intensity distribution so as to generate emitted laser light, the method comprising:
measuring the intensity distribution of the incident laser light;
dividing the measured intensity distribution of the incident laser light in a distribution direction so as to obtain a plurality of incident light division areas, for each of a short-axial direction and a long-axial direction of the incident laser light, in an incident aspheric lens of the pair of the aspheric lenses;
dividing an intensity distribution of the emitted laser light in a distribution direction, so as to obtain a plurality of emitted light division areas by adjusting a height of each of the plurality of incident light division areas and simultaneously adjusting a width and a position of the distribution direction of each of the plurality of incident light division areas according to the desired intensity distribution, for each of the short-axial direction and the long-axial direction, in an emitting aspheric lens of the pair of the aspheric lenses;
specifying a light path from a position of the distribution direction of the plurality of incident light division areas in the incident aspheric lens and a corresponding position of the distribution direction of the plurality of emitted light division areas in the emitting aspheric lens for each of the short-axial direction and the long-axial direction;
obtaining shapes in the short-axial direction and the long-axial direction of the pair of the aspheric lenses from the light path;
performing approximation of a high-order polynomial of the shapes in the short-axial direction and long-axial direction of the pair of the aspheric lenses, so as to obtain high-order polynomials of the short-axial direction and the long-axial direction;
correcting the high-order polynomial of the short-axial direction or the high-order polynomial of the long-axial direction by using a correction coefficient based on a rotary angle of a radius vector of the incident laser light, a ratio defined by a radius vector of the long-axial direction and a radius vector of the short-axial direction of the incident laser light, and a ratio defined by the shape in the long-axial direction and the shape in the short-axial direction for each of the pair of the aspheric lens, so as to obtain the corrected high-order polynomial; and obtaining shapes of the pair of the aspheric lenses based on the corrected high-order polynomial.

2. The method according to claim 1, wherein in the dividing of the intensity distribution of the emitted laser light, the width and the position of the distribution direction of the plurality of incident light division areas are adjusted to obtain the plurality of emitted light division areas so that energy of the plurality of incident light division areas is equal to corresponding energy of the plurality of emitted light division areas.

3. The method according to claim 1, wherein in the measuring of the intensity distribution of the incident laser light, the divergence angles of the incident laser light is further measured, and in the obtaining of the shapes in the short-axial direction and the long-axial direction, the shape of the incident aspheric lens is obtained from the light path and the measured divergence angles of the incident laser-light.

4. The method according to claim 3, wherein in the obtaining of the shapes in the short-axial direction and the long-axial direction, with each of the plurality of incident light division areas, an incident angle of refracted incident laser light, which is the incident laser light refracted in a plane surface of the incident aspheric lens, for an emitting aspheric surface of the incident aspheric lens is obtained from an angle defined by the light path to a main axis perpendicular to an incident plane surface of the incident aspheric lens and the measured divergence angle of the incident laser light, and a difference of elevation of the aspheric surface of the incident aspheric lens is obtained from the incident angle of the refracted incident laser light for the aspheric surface of the incident aspheric lens.

5. The method according to claim 1, wherein in the obtaining of the shapes in the short-axial direction and the long-axial direction, the shape of the emitting aspheric lens is obtained from the light path and a desired divergence angle of the emitted laser light.

6. The method according to claim 5, wherein in the obtaining of the shapes in the short-axial direction and the long-axial direction, with each of the plurality of emitted light division areas, a refraction angle of the light path for an incident aspheric surface of the emitting aspheric lens is obtained from an angle defined by the light path for the main axis perpendicular to an emitting plane surface of the emitting aspheric lens and the desired divergence angle of the emitted laser light, and a difference of elevation of the aspheric surface of the emitting aspheric lens is obtained from the refraction angle of the light path for the aspheric surface of the emitting aspheric lens.

7. The method according to claim 1, wherein in the obtaining of the shapes in the short-axial direction and the long-axis direction, the shape of the emitting aspheric lens is obtained from the light path so that the emitted laser light is in phase and forms parallel light.

8. The method according to claim 7, wherein in the obtaining of the shapes in the short-axial direction and the long-axial direction, with each of the plurality of emitted light division areas, an emission angle of the emitted laser light for the incident aspheric surface of the emitting aspheric lens is obtained from an angle defined by the light path for the main axis perpendicular to an emitting plane surface of the emitting aspheric lens, and a difference of elevation of an aspheric surface of the emitting aspheric lens is obtained from the emission angle of the emitted laser light for the aspheric surface of the emitting aspheric lens.

9. An optical system for shaping laser light, the optical system comprising:
a light source for generating laser light with different divergence angles;
an optical component for shaping laser light so as to shape intensity distribution of the laser light from the light source into a desired intensity distribution, which is designed by the method of designing the optical component for shaping the laser light according to claim 1; and
a condensing lens for condensing the laser light from the optical component for shaping the laser light.

10. An optical system for shaping laser light, the optical system comprising:
a plurality of light sources for generating the laser light with different divergence angles, which are arranged in two dimensions;
a plurality of optical components for shaping laser light, which are arranged in two dimensions, shape intensity distribution of the laser light from each of the plurality of light sources in a desired intensity distribution and are designed by the method of designing the optical component for shaping the laser light according to claim 1; and
a condensing lens for condensing laser lights from the plurality of optical components for shaping the laser light.

11. A method of manufacturing an optical component for shaping laser light, which includes a pair of aspheric lenses and shapes an intensity distribution of incident laser light with different divergence angles into a desired intensity distribution so as to generate emitted laser light, the method comprising:
measuring the intensity distribution of the incident laser light;
dividing the measured intensity distribution of the incident laser light in a distribution direction so as to obtain a plurality of incident light division areas, for each of a short-axial direction and a long-axial direction of the incident laser light, in an incident aspheric lens of the pair of the aspheric lenses;
dividing an intensity distribution of the emitted laser light in a distribution direction, so as to obtain a plurality of emitted light division areas by adjusting a height of each of the plurality of incident light division areas and simultaneously adjusting a width and a position of the distribution direction of each of the plurality of incident light division areas according to a desired intensity distribution, for each of the short-axial direction and the long-axial direction, in an emitting aspheric lens of the pair of the aspheric lenses;
specifying a light path from a position of the distribution direction of the plurality of incident light division areas in the incident aspheric lens and a corresponding position of the distribution direction of the plurality of emitted light division areas in the emitting aspheric lens for each of the short-axial direction and the long-axial direction;
obtaining shapes in the short-axial direction and the long-axial direction of the pair of the aspheric lenses from the light path;

performing approximation of a high-order polynomial of the shapes in the short-axial direction and long-axial direction of the pair of the aspheric lenses, so as to obtain high-order polynomials of the short-axial direction and the long-axial direction;

correcting the high-order polynomial of the short-axial direction or the high-order polynomial of the long-axial direction by using a correction coefficient based on a rotary angle of a radius vector of the incident laser light, a ratio defined by a radius vector of the long-axial direction and a radius vector of the short-axial direction of the incident laser light, and a ratio defined by the shape in the long-axial direction and the shape in the short-axial direction for each of the pair of the aspheric lens, so as to obtain the corrected high-order polynomial;

obtaining shapes of the pair of the aspheric lenses based on the corrected high-order polynomial; and forming the pair of aspheric lenses based on the obtained shapes.

* * * * *